(12) United States Patent
Rosenberg

(10) Patent No.: US 7,577,522 B2
(45) Date of Patent: Aug. 18, 2009

(54) SPATIALLY ASSOCIATED PERSONAL REMINDER SYSTEM AND METHOD

(75) Inventor: Louis B. Rosenberg, Pismo Beach, CA (US)

(73) Assignee: Outland Research, LLC, Pismo Beach, CA (US)

( * ) Notice: Subject to any disclaimer, the term of this patent is extended or adjusted under 35 U.S.C. 154(b) by 310 days.

(21) Appl. No.: 11/427,325

(22) Filed: Jun. 28, 2006

(65) Prior Publication Data
US 2007/0129888 A1 Jun. 7, 2007

Related U.S. Application Data

(60) Provisional application No. 60/742,625, filed on Dec. 5, 2005.

(51) Int. Cl.
*G01C 21/00* (2006.01)
(52) U.S. Cl. .................. 701/213; 701/207; 342/357.17; 340/539.13
(58) Field of Classification Search .................. 701/213, 701/207; 340/996, 988, 993, 539.13; 342/357.13, 342/357.17
See application file for complete search history.

(56) References Cited

U.S. PATENT DOCUMENTS

| | | | |
|---|---|---|---|
| 4,018,121 A | 4/1977 | Chower | |
| 4,050,171 A | 9/1977 | Teach | |
| 4,054,749 A | 10/1977 | Suzuki | |
| 4,091,302 A | 5/1978 | Yamashita | |
| 4,337,529 A | 6/1982 | Morokawa | |
| 4,360,345 A | 11/1982 | Hon | |
| 4,403,208 A | 9/1983 | Hodgson et al. | |

(Continued)

FOREIGN PATENT DOCUMENTS

DE 19650900 6/1998

(Continued)

OTHER PUBLICATIONS

Lumia, R et al., "Microgripper design using electo-active polymers", *SPIE Conference on Electroactive Polymer Actuators and Devices*, SPEE vol. 3669, 1999, (Mar. 1999).

(Continued)

*Primary Examiner*—Mark Hellner
(74) *Attorney, Agent, or Firm*—Thomas F. Lebens; Sinsheimer Juhnke Lebens & McIvor, LLP

(57) ABSTRACT

Spatially associated reminder systems and methods enable users to create reminders and associate those reminders with entering/exiting particular trigger areas. A user's portable computing device triggers an alert/displays a reminder based upon a user entering and/or exiting a trigger area. A user interface supported by the portable computing device allows a user to terminate the reminder so it will not trigger again, to defer the reminder so it triggers again after an elapsed time, to reset the reminder so that it triggers again only if a user leaves the area and then returns, to request a last chance, causing the portable computing device to remind the user again upon exiting the area to ensure the user did not forget to act upon the reminder, or to edit the reminder. The user interface also enables users to graphically define trigger areas within the physical world to be associated with personal digital reminders using geospatial imagery.

27 Claims, 8 Drawing Sheets

U.S. PATENT DOCUMENTS

| | | |
|---|---|---|
| 4,430,595 A | 2/1984 | Nakasone |
| 4,490,810 A | 12/1984 | Hon |
| 4,712,101 A | 12/1987 | Culver |
| 4,788,983 A | 12/1988 | Brink |
| 4,823,634 A | 4/1989 | Culver |
| 4,868,549 A | 9/1989 | Affinito |
| 4,907,973 A | 3/1990 | Hon |
| 4,919,418 A | 4/1990 | Miller |
| 4,934,694 A | 6/1990 | McIntosh |
| 4,949,089 A | 8/1990 | Ruszkowski, Jr. |
| 4,983,901 A | 1/1991 | Lehmer |
| 5,047,918 A | 9/1991 | Schwartz et al. |
| 5,047,952 A | 9/1991 | Kramer et al. |
| 5,149,084 A | 9/1992 | Dalebout et al. |
| 5,154,677 A | 10/1992 | Ito |
| 5,164,530 A | 11/1992 | Iwase |
| 5,179,792 A | 1/1993 | Brantingham |
| 5,185,561 A | 2/1993 | Good |
| 5,186,629 A | 2/1993 | Rohen |
| 5,189,355 A | 2/1993 | Larkins |
| 5,215,468 A | 6/1993 | Lauffer |
| 5,220,260 A | 6/1993 | Schuler |
| 5,267,942 A | 12/1993 | Saperston |
| 5,273,038 A | 12/1993 | Beavin |
| 5,290,205 A | 3/1994 | Densmore et al. |
| 5,296,846 A | 3/1994 | Ledley |
| 5,296,871 A | 3/1994 | Paley |
| 5,308,300 A | 5/1994 | Chino et al. |
| 5,335,188 A | 8/1994 | Brisson |
| 5,359,527 A | 10/1994 | Takanabe |
| 5,387,164 A | 2/1995 | Brown, Jr. |
| 5,437,289 A | 8/1995 | Liverance et al. |
| 5,442,557 A | 8/1995 | Kaneko |
| 5,449,002 A | 9/1995 | Goldman |
| 5,451,192 A | 9/1995 | Hefele |
| 5,491,546 A | 2/1996 | Wascher |
| 5,499,360 A | 3/1996 | Barbara et al. |
| 5,534,917 A | 7/1996 | MacDougall |
| 5,545,112 A | 8/1996 | Densmore et al. |
| 5,559,412 A | 9/1996 | Schuler |
| 5,572,201 A | 11/1996 | Graham et al. |
| 5,592,143 A | 1/1997 | Romney |
| 5,598,849 A | 2/1997 | Browne |
| 5,614,687 A | 3/1997 | Yamada et al. |
| 5,629,594 A | 5/1997 | Jacobus |
| 5,634,051 A | 5/1997 | Thomson |
| 5,643,087 A | 7/1997 | Marcus |
| 5,666,138 A | 9/1997 | Culver |
| 5,690,582 A | 11/1997 | Ulrich et al. |
| 5,699,441 A | 12/1997 | Sagawa et al. |
| 5,701,140 A | 12/1997 | Rosenberg |
| 5,704,791 A | 1/1998 | Gillio |
| 5,709,219 A | 1/1998 | Chen |
| 5,721,566 A | 2/1998 | Rosenberg |
| 5,724,264 A | 3/1998 | Rosenberg |
| 5,728,960 A | 3/1998 | Sitrick |
| 5,731,804 A | 3/1998 | Rosenberg |
| 5,734,373 A | 3/1998 | Rosenberg |
| 5,739,811 A | 4/1998 | Rosenberg |
| 5,742,278 A | 4/1998 | Chen |
| 5,747,714 A | 5/1998 | Kniest et al. |
| 5,754,023 A | 5/1998 | Roston |
| 5,755,577 A | 5/1998 | Gillio |
| 5,767,839 A | 6/1998 | Rosenberg |
| 5,769,640 A | 6/1998 | Jacobus |
| 5,791,908 A | 8/1998 | Gillio |
| 5,794,361 A | 8/1998 | Sadler |
| 5,800,177 A | 9/1998 | Gillio |
| 5,800,178 A | 9/1998 | Gillio |
| 5,807,267 A | 9/1998 | Bryars et al. |
| 5,813,142 A | 9/1998 | Demon |
| 5,821,920 A | 10/1998 | Rosenberg |
| 5,825,308 A | 10/1998 | Rosenberg |
| 5,828,197 A | 10/1998 | Martin |
| 5,839,901 A | 11/1998 | Karkanen |
| 5,857,939 A | 1/1999 | Kaufman |
| 5,870,740 A | 2/1999 | Rose et al. |
| 5,882,206 A | 3/1999 | Gillio |
| 5,889,670 A | 3/1999 | Schuler |
| 5,889,672 A | 3/1999 | Schuler |
| 5,890,116 A | 3/1999 | Itoh et al. |
| 5,890,128 A | 3/1999 | Diaz et al. |
| 5,890,995 A | 4/1999 | Bobick et al. |
| 5,890,997 A | 4/1999 | Roth |
| 5,897,437 A | 4/1999 | Nishiumi |
| 5,916,063 A | 6/1999 | Alessandri |
| 5,928,248 A | 7/1999 | Acker |
| 5,931,763 A | 8/1999 | Alessandri |
| 5,941,837 A | 8/1999 | Amano et al. |
| 5,944,633 A | 8/1999 | Wittrock |
| 5,952,596 A | 9/1999 | Kondo |
| 5,953,693 A | 9/1999 | Sakiyama et al. |
| 5,959,613 A | 9/1999 | Rosenberg |
| 5,989,188 A | 11/1999 | Birkhoelzer et al. |
| 6,013,007 A | 1/2000 | Root |
| 6,024,576 A | 2/2000 | Moore |
| 6,088,017 A | 7/2000 | Tremblay |
| 6,096,004 A | 8/2000 | Megland |
| 6,106,301 A | 8/2000 | Merril |
| 6,111,577 A | 8/2000 | Zilles |
| 6,119,114 A | 9/2000 | Smadja |
| 6,122,520 A | 9/2000 | Want |
| 6,154,201 A | 11/2000 | Levin et al. |
| 6,160,489 A | 12/2000 | Perry |
| 6,177,905 B1 * | 1/2001 | Welch .................. 342/357.13 |
| 6,192,340 B1 | 2/2001 | Abecassis |
| 6,199,067 B1 | 3/2001 | Geller |
| 6,211,861 B1 | 4/2001 | Rosenberg et al. |
| 6,221,861 B1 | 4/2001 | Seegmiller |
| 6,230,047 B1 | 5/2001 | McHugh |
| 6,239,501 B1 | 5/2001 | Komarechka |
| 6,244,742 B1 | 6/2001 | Yamada et al. |
| 6,244,988 B1 | 6/2001 | Delman |
| 6,246,362 B1 | 6/2001 | Tsubata |
| 6,251,048 B1 | 6/2001 | Kaufman |
| 6,255,799 B1 | 7/2001 | Le et al. |
| 6,256,011 B1 | 7/2001 | Culver |
| 6,266,612 B1 * | 7/2001 | Dussell et al. .............. 701/207 |
| 6,285,317 B1 | 9/2001 | Ong |
| 6,287,262 B1 | 9/2001 | Amano et al. |
| 6,292,747 B1 | 9/2001 | Amro et al. |
| 6,298,323 B1 | 10/2001 | Kaemmerer |
| 6,300,938 B1 | 10/2001 | Culver |
| 6,304,520 B1 | 10/2001 | Watanabe |
| 6,314,094 B1 | 11/2001 | Boys et al. |
| 6,315,694 B1 | 11/2001 | Osu et al. |
| 6,323,412 B1 | 11/2001 | Loo |
| 6,351,710 B1 | 2/2002 | Mays |
| 6,366,272 B1 | 4/2002 | Rosenberg |
| 6,376,971 B1 | 4/2002 | Pelrine |
| 6,401,027 B1 | 6/2002 | Xu et al. |
| 6,401,037 B1 | 6/2002 | Muller et al. |
| 6,411,896 B1 | 6/2002 | Shuman et al. |
| 6,417,782 B1 | 7/2002 | Darnall |
| 6,429,846 B2 | 8/2002 | Rosenberg |
| 6,470,207 B1 | 10/2002 | Simon |
| 6,470,302 B1 | 10/2002 | Cunningham |
| 6,477,239 B1 | 11/2002 | Ohki et al. |
| 6,497,638 B1 | 12/2002 | Shea |
| 6,498,982 B2 | 12/2002 | Bellesfield et al. |
| 6,501,420 B2 | 12/2002 | Townsend |
| 6,503,173 B2 | 1/2003 | Clem |
| 6,506,142 B2 | 1/2003 | Itoh et al. |
| 6,515,593 B1 | 2/2003 | Stark et al. |

| | | |
|---|---|---|
| 6,515,651 B1 | 2/2003 | Berstis |
| 6,522,292 B1 | 2/2003 | Ellenby et al. |
| 6,526,411 B1 | 2/2003 | Ward |
| 6,527,674 B1 | 3/2003 | Clem |
| 6,529,831 B1 | 3/2003 | Smith et al. |
| 6,539,232 B2 | 3/2003 | Hendrey et al. |
| 6,563,487 B2 | 5/2003 | Martin |
| 6,564,210 B1 | 5/2003 | Korda et al. |
| 6,571,200 B1 | 5/2003 | Mault |
| 6,572,511 B1 | 6/2003 | Volpe |
| 6,598,707 B2 | 7/2003 | Nakagaki et al. |
| 6,607,493 B2 | 8/2003 | Song |
| 6,618,593 B1 | 9/2003 | Drutman et al. |
| 6,623,427 B2 | 9/2003 | Mandigo |
| 6,626,728 B2 | 9/2003 | Holt |
| 6,636,835 B2 | 10/2003 | Ragsdale-Elliott et al. |
| 6,640,187 B1 | 10/2003 | Chenault |
| 6,655,817 B2 | 12/2003 | Devlin |
| 6,657,116 B1 | 12/2003 | Gunnerson |
| 6,659,916 B1 | 12/2003 | Shea |
| 6,665,644 B1 | 12/2003 | Kanevsky et al. |
| 6,671,736 B2 | 12/2003 | Virine et al. |
| 6,680,675 B1 * | 1/2004 | Suzuki ................... 340/988 |
| 6,683,538 B1 | 1/2004 | Wilkes, Jr. |
| 6,686,531 B1 | 2/2004 | Pennock et al. |
| 6,686,911 B1 | 2/2004 | Levin |
| 6,687,535 B2 | 2/2004 | Hautala et al. |
| 6,697,044 B2 | 2/2004 | Shahoian |
| 6,697,048 B2 | 2/2004 | Rosenberg et al. |
| 6,702,719 B1 | 3/2004 | Brown et al. |
| 6,721,706 B1 | 4/2004 | Strubbe et al. |
| 6,732,090 B2 | 5/2004 | Shanahan et al. |
| 6,735,568 B1 | 5/2004 | Buckwalter et al. |
| 6,740,007 B2 | 5/2004 | Gordon et al. |
| 6,749,537 B1 | 6/2004 | Hickman |
| 6,768,066 B2 | 7/2004 | Wehrenberg |
| 6,768,246 B2 | 7/2004 | Pelrine |
| 6,772,026 B2 | 8/2004 | Bradbury et al. |
| 6,778,226 B1 | 8/2004 | Eshelman |
| 6,781,289 B2 | 8/2004 | Levin |
| 6,783,482 B2 | 8/2004 | Oglesby et al. |
| 6,786,848 B2 | 9/2004 | Yamashita et al. |
| 6,790,178 B1 | 9/2004 | Mault et al. |
| 6,793,607 B2 | 9/2004 | Neil |
| 6,801,837 B2 | 10/2004 | Carlstedt et al. |
| 6,804,643 B1 | 10/2004 | Kiss |
| 6,808,472 B1 | 10/2004 | Hickman |
| 6,808,473 B2 | 10/2004 | Hisano |
| 6,812,394 B2 | 11/2004 | Weissflog |
| 6,812,624 B1 | 11/2004 | Pei et al. |
| 6,816,711 B2 | 11/2004 | Standke |
| 6,819,267 B1 | 11/2004 | Edmark |
| 6,822,635 B2 | 11/2004 | Shahoian |
| 6,824,502 B1 | 11/2004 | Huang |
| 6,829,599 B2 | 12/2004 | Chidlovskii |
| 6,832,109 B2 | 12/2004 | Nissila |
| 6,836,744 B1 | 12/2004 | Asphahani et al. |
| 6,858,970 B2 | 2/2005 | Malkin |
| 6,863,220 B2 | 3/2005 | Selker |
| 6,863,641 B1 | 3/2005 | Brown et al. |
| 6,866,613 B1 | 3/2005 | Brown et al. |
| 6,867,733 B2 | 3/2005 | Sandhu |
| 6,871,142 B2 | 3/2005 | Kumada et al. |
| 6,879,284 B2 | 4/2005 | Dufek |
| 6,882,086 B2 | 4/2005 | Kornbluh |
| 6,885,362 B2 | 4/2005 | Suomela |
| 6,888,457 B2 | 5/2005 | Wilkinson et al. |
| 6,906,533 B1 | 6/2005 | Yoshida |
| 6,906,643 B2 | 6/2005 | Samadani |
| 6,915,295 B2 | 7/2005 | Okamoto et al. |
| 6,917,373 B2 | 7/2005 | Vong et al. |
| 6,921,351 B1 | 7/2005 | Hickman |
| 6,929,481 B1 | 8/2005 | Alexander |
| 6,941,324 B2 | 9/2005 | Plastina et al. |
| 6,950,695 B2 | 9/2005 | Chen |
| 6,955,630 B2 | 10/2005 | Sher |
| 6,956,538 B2 | 10/2005 | Moore |
| 6,958,707 B1 | 10/2005 | Siegel |
| 6,965,842 B2 | 11/2005 | Rekimoto |
| 6,970,088 B2 | 11/2005 | Kovach |
| 6,978,684 B2 | 12/2005 | Nurse |
| 6,982,697 B2 | 1/2006 | Wilson |
| 6,982,700 B2 | 1/2006 | Rosenberg et al. |
| 6,983,139 B2 | 1/2006 | Dowling et al. |
| 6,985,143 B2 | 1/2006 | Pharr |
| 6,986,320 B2 | 1/2006 | Shelton |
| 6,987,221 B2 | 1/2006 | Platt |
| 6,991,586 B2 | 1/2006 | Lapcevic |
| 6,997,852 B2 | 2/2006 | Watterson et al. |
| 7,003,122 B2 | 2/2006 | Chen |
| 7,007,001 B2 | 2/2006 | Oliver et al. |
| 7,012,593 B2 | 3/2006 | Yoon et al. |
| 7,022,047 B2 | 4/2006 | Cohen et al. |
| 7,023,423 B2 | 4/2006 | Rosenberg |
| 7,027,823 B2 | 4/2006 | Mikuni |
| 7,031,875 B2 | 4/2006 | Ellenby et al. |
| 7,044,891 B1 | 5/2006 | Rivera |
| 7,046,588 B2 | 5/2006 | Heo |
| 7,060,006 B1 | 6/2006 | Watterson et al. |
| 7,089,264 B1 | 8/2006 | Guido et al. |
| 7,092,964 B1 | 8/2006 | Dougherty |
| 7,100,835 B2 | 9/2006 | Selker |
| 7,138,575 B2 | 11/2006 | Childs et al. |
| 7,156,773 B2 | 1/2007 | Takai et al. |
| 7,166,062 B1 | 1/2007 | Watterson et al. |
| 7,177,672 B2 | 2/2007 | Nissila |
| 7,181,438 B1 | 2/2007 | Szabo |
| 7,199,708 B2 | 4/2007 | Terauchi et al. |
| 7,207,935 B1 | 4/2007 | Lipo |
| 7,225,565 B2 | 6/2007 | DiBenedetto et al. |
| 7,227,071 B2 | 6/2007 | Tagawa et al. |
| 7,229,416 B2 | 6/2007 | Chen |
| 7,232,416 B2 | 6/2007 | Czernicki |
| 7,249,126 B1 | 7/2007 | Ginsburg et al. |
| 7,271,736 B2 | 9/2007 | Siegel et al. |
| 7,283,997 B1 | 10/2007 | Howard et al. |
| RE39,906 E | 11/2007 | Roston et al. |
| 7,293,060 B2 | 11/2007 | Komsi |
| 7,310,676 B2 | 12/2007 | Bourne |
| 7,310,895 B2 | 12/2007 | Whittlesey et al. |
| 7,312,766 B1 | 12/2007 | Edwards |
| 7,312,785 B2 | 12/2007 | Tsuk et al. |
| 7,342,649 B2 | 3/2008 | Waibel |
| 7,344,508 B2 | 3/2008 | Surina |
| 7,348,967 B2 | 3/2008 | Zadesky et al. |
| 7,359,624 B2 | 4/2008 | Adams et al. |
| 7,373,820 B1 | 5/2008 | James |
| 7,394,405 B2 * | 7/2008 | Godden ................... 340/996 |
| 2001/0003542 A1 | 6/2001 | Kita |
| 2001/0004622 A1 | 6/2001 | Alessandri |
| 2001/0020242 A1 | 9/2001 | Gupta |
| 2001/0041647 A1 | 11/2001 | Itoh et al. |
| 2002/0008635 A1 | 1/2002 | Ewing et al. |
| 2002/0016786 A1 | 2/2002 | Pitkow et al. |
| 2002/0054060 A1 | 5/2002 | Schena |
| 2002/0059296 A1 | 5/2002 | Hayashi |
| 2002/0078045 A1 | 6/2002 | Dutta |
| 2002/0091049 A1 | 7/2002 | Hisano |
| 2002/0091796 A1 | 7/2002 | Higginson |
| 2002/0116476 A1 | 8/2002 | Eyal et al. |
| 2002/0123988 A1 | 9/2002 | Dean |
| 2002/0133418 A1 | 9/2002 | Hammond et al. |
| 2002/0142701 A1 | 10/2002 | Rosenberg |
| 2002/0152077 A1 | 10/2002 | Patterson |
| 2002/0186221 A1 | 12/2002 | Bell |
| 2003/0009497 A1 | 1/2003 | Yu |

| | | |
|---|---|---|
| 2003/0011467 A1 | 1/2003 | Suomela |
| 2003/0018527 A1 | 1/2003 | Filepp |
| 2003/0033287 A1 | 2/2003 | Shanahan et al. |
| 2003/0041105 A1 | 2/2003 | Patrick |
| 2003/0047683 A1 | 3/2003 | Kaushal |
| 2003/0069077 A1 | 4/2003 | Korienek |
| 2003/0076301 A1 | 4/2003 | Tsuk et al. |
| 2003/0089218 A1 | 5/2003 | Gang et al. |
| 2003/0110038 A1 | 6/2003 | Sharma |
| 2003/0115193 A1 | 6/2003 | Okamoto et al. |
| 2003/0132301 A1 | 7/2003 | Selker |
| 2003/0135490 A1 | 7/2003 | Barrett et al. |
| 2003/0187837 A1 | 10/2003 | Culliss |
| 2003/0193572 A1 | 10/2003 | Wilson |
| 2003/0195884 A1 | 10/2003 | Boyd et al. |
| 2003/0217007 A1 | 11/2003 | Fukushima |
| 2003/0220917 A1 | 11/2003 | Copperman et al. |
| 2003/0236582 A1 | 12/2003 | Zamir et al. |
| 2004/0012506 A1 | 1/2004 | Fujiwara |
| 2004/0015714 A1 | 1/2004 | Abraham et al. |
| 2004/0017482 A1 | 1/2004 | Weitman |
| 2004/0019588 A1 | 1/2004 | Doganata et al. |
| 2004/0025563 A1 | 2/2004 | Stierle |
| 2004/0059708 A1 | 3/2004 | Dean |
| 2004/0068486 A1 | 4/2004 | Chidlovskii |
| 2004/0097806 A1 | 5/2004 | Hunter |
| 2004/0102684 A1 | 5/2004 | Kawanishi et al. |
| 2004/0103087 A1 | 5/2004 | Mukherjee et al. |
| 2004/0114129 A1 | 6/2004 | Gogolla |
| 2004/0124248 A1 | 7/2004 | Selker |
| 2004/0125073 A1 | 7/2004 | Potter |
| 2004/0164971 A1 | 8/2004 | Hayward |
| 2004/0166937 A1 | 8/2004 | Rothschild |
| 2004/0186824 A1 | 9/2004 | Delic et al. |
| 2004/0204240 A1 | 10/2004 | Barney |
| 2004/0215469 A1 | 10/2004 | Fukushima |
| 2004/0219961 A1 | 11/2004 | Ellenby |
| 2004/0224638 A1 | 11/2004 | Fadell et al. |
| 2004/0225519 A1 | 11/2004 | Martin |
| 2004/0225635 A1 | 11/2004 | Toyama |
| 2004/0248653 A1 | 12/2004 | Barros |
| 2004/0252397 A1 | 12/2004 | Hodge et al. |
| 2005/0012611 A1* | 1/2005 | Osman ................. 340/539.13 |
| 2005/0021470 A1 | 1/2005 | Martin et al. |
| 2005/0032528 A1 | 2/2005 | Dowling |
| 2005/0039206 A1 | 2/2005 | Opdycke |
| 2005/0049113 A1 | 3/2005 | Yueh |
| 2005/0060299 A1 | 3/2005 | Filley |
| 2005/0071328 A1 | 3/2005 | Lawrence et al. |
| 2005/0080786 A1 | 4/2005 | Fish |
| 2005/0096047 A1 | 5/2005 | Haberman et al. |
| 2005/0107218 A1 | 5/2005 | Chuang et al. |
| 2005/0107688 A1 | 5/2005 | Strommer |
| 2005/0114149 A1 | 5/2005 | Rodriguez |
| 2005/0126370 A1 | 6/2005 | Takai |
| 2005/0129253 A1 | 6/2005 | Chen |
| 2005/0130802 A1 | 6/2005 | Kinnunen et al. |
| 2005/0134479 A1 | 6/2005 | Isaji |
| 2005/0139660 A1 | 6/2005 | Maxymych et al. |
| 2005/0141729 A1 | 6/2005 | Kanzaki |
| 2005/0143173 A1 | 6/2005 | Barney et al. |
| 2005/0149213 A1 | 7/2005 | Guzak et al. |
| 2005/0149499 A1 | 7/2005 | Franz et al. |
| 2005/0154636 A1 | 7/2005 | Hildinger et al. |
| 2005/0174975 A1 | 8/2005 | Mgrdechian et al. |
| 2005/0177614 A1 | 8/2005 | Bourne |
| 2005/0182564 A1 | 8/2005 | Kim |
| 2005/0184878 A1 | 8/2005 | Grold et al. |
| 2005/0197237 A1 | 9/2005 | Chen |
| 2005/0210419 A1 | 9/2005 | Kela et al. |
| 2005/0212749 A1 | 9/2005 | Marvit et al. |
| 2005/0222981 A1 | 10/2005 | Lawrence et al. |
| 2005/0222989 A1 | 10/2005 | Haveliwala et al. |
| 2005/0227712 A1 | 10/2005 | Estevez |
| 2005/0233859 A1 | 10/2005 | Takai et al. |
| 2005/0233861 A1 | 10/2005 | Hickman et al. |
| 2005/0234638 A1 | 10/2005 | Ogaki |
| 2005/0240342 A1 | 10/2005 | Ishihara |
| 2005/0261609 A1 | 11/2005 | Collings et al. |
| 2005/0266961 A1 | 12/2005 | Shum et al. |
| 2005/0278317 A1 | 12/2005 | Gross et al. |
| 2005/0286546 A1 | 12/2005 | Basseli et al. |
| 2006/0004512 A1 | 1/2006 | Herbst |
| 2006/0017692 A1 | 1/2006 | Wehrenberg et al. |
| 2006/0020177 A1 | 1/2006 | Seo et al. |
| 2006/0022955 A1 | 2/2006 | Kennedy |
| 2006/0026521 A1 | 2/2006 | Hotelling et al. |
| 2006/0052132 A1 | 3/2006 | Naukkarinen |
| 2006/0060068 A1 | 3/2006 | Hwang |
| 2006/0079800 A1 | 4/2006 | Martikka et al. |
| 2006/0084551 A1 | 4/2006 | Volpe, Jr. |
| 2006/0095412 A1 | 5/2006 | Zito et al. |
| 2006/0097991 A1 | 5/2006 | Hotelling et al. |
| 2006/0098772 A1 | 5/2006 | Reho et al. |
| 2006/0101377 A1 | 5/2006 | Toyama et al. |
| 2006/0102171 A1 | 5/2006 | Gavish |
| 2006/0107822 A1 | 5/2006 | Bowen |
| 2006/0111621 A1 | 5/2006 | Coppi et al. |
| 2006/0136173 A1 | 6/2006 | Case et al. |
| 2006/0161621 A1 | 7/2006 | Rosenberg |
| 2006/0164382 A1 | 7/2006 | Kulas |
| 2006/0167576 A1 | 7/2006 | Rosenberg |
| 2006/0167943 A1 | 7/2006 | Rosenberg |
| 2006/0169125 A1 | 8/2006 | Ashkenazi |
| 2006/0173828 A1 | 8/2006 | Rosenberg |
| 2006/0173837 A1 | 8/2006 | Berstis et al. |
| 2006/0188109 A1 | 8/2006 | Makino et al. |
| 2006/0189386 A1 | 8/2006 | Rosenberg |
| 2006/0195361 A1 | 8/2006 | Rosenberg |
| 2006/0229163 A1 | 10/2006 | Waters |
| 2006/0243120 A1 | 11/2006 | Takai |
| 2006/0253210 A1 | 11/2006 | Rosenberg |
| 2006/0256082 A1 | 11/2006 | Cho |
| 2006/0276919 A1 | 12/2006 | Shirai |
| 2006/0288846 A1 | 12/2006 | Logan |
| 2007/0021269 A1 | 1/2007 | Shum |
| 2007/0027000 A1 | 2/2007 | Shirai |
| 2007/0044641 A1 | 3/2007 | McKinney et al. |
| 2007/0060446 A1 | 3/2007 | Asukai |
| 2007/0067294 A1 | 3/2007 | Ward et al. |
| 2007/0074618 A1 | 4/2007 | Vergo |
| 2007/0074619 A1 | 4/2007 | Vergo |
| 2007/0079691 A1 | 4/2007 | Turner |
| 2007/0103431 A1 | 5/2007 | Tabatowski-Bush |
| 2007/0113725 A1 | 5/2007 | Oliver |
| 2007/0125852 A1 | 6/2007 | Rosenberg |
| 2007/0135264 A1 | 6/2007 | Rosenberg |
| 2007/0145680 A1 | 6/2007 | Rosenberg |
| 2007/0156676 A1 | 7/2007 | Rosenberg |
| 2007/0156677 A1 | 7/2007 | Szabo |
| 2007/0173377 A1 | 7/2007 | Jamsen et al. |
| 2007/0174416 A1 | 7/2007 | Waters |
| 2007/0198182 A1 | 8/2007 | Singh |
| 2007/0236493 A1 | 10/2007 | Horiuchi |
| 2007/0271228 A1 | 11/2007 | Querel |
| 2008/0005075 A1 | 1/2008 | Horvitz et al. |
| 2008/0016040 A1 | 1/2008 | Jones et al. |
| 2008/0016218 A1 | 1/2008 | Jones et al. |
| 2008/0147217 A1 | 6/2008 | Chung |

FOREIGN PATENT DOCUMENTS

| | | |
|---|---|---|
| WO | WO-02073818 | 9/2002 |

| | | |
|---|---|---|
| WO | WO-2006086439 | 8/2006 |

OTHER PUBLICATIONS

"Human Metrics: Jung Typology Test", available at: http://www.humanmetrics.com/cgi-win/JTypes2.asp last visited Jun. 15, 2007.
Rosenberg, "U.S. Appl. No. 11/246,050", (filed Feb. 8, 2007).
Rosenberg, "U.S. Appl. No. 11/260,000", (filed Oct. 26, 2005).
Office Action from 11282379 dated Sep. 18, 2007.
Kornbluh, et al., "High-field Electrostriction of Elastomeric Polymer Dielectrics for Actuation", *SPIE Conference on Electroactive Polymer Actuators and Devices*, (Mar. 1999).
Kawahara, et al., "Designing a Universal Remote Control for the Ubiquitous Computing Environment," *EE TImes*, 2003.
Abrial, et al., "A New Contactless Smartcard IC Using an On-Chip Antenna and an Asynchronous Micro-controller", (2001).
Rosenberg, "U.S. Appl. No. 11/341,100", (filed Jan. 27, 2006).
Rosenberg, "U.S. Appl. No. 11/278,120", (filed Oct. 5, 2006).
Morhring, et al., "Video See-Through AR on Consumer Cell-Phones", (Mar. 2004).
Gordon, et al., "Silicon Optical Navigation", (2003).
"Remotely Operated Vehicles Seaeye Falcon", www.roperresources.com, (May 2002).
"Remotely Operated Vehicle", www.seabotix.com/products/lbv150.htm, (Dec. 2001).
"Unmanned Aircraft Systems", www.baiaerosystems.com, (1985).
"www.gesturetek.com", (Jul. 1996).
"www.reactrix.com", (2002).
Office Action from 11422065 dated Mar. 28, 2007.
Office Action from 11422065 dated Aug. 31, 2007.
Rosenberg, "U.S. Appl. No. 11/749,134", (filed May 15, 2007).
Rosenberg, "U.S. Appl. No. 11/749,137", (filed May 15, 2007).
Rosenberg, "U.S. Appl. No. 11/762,017", (filed Oct. 4, 2007).
Rosenberg, "U.S. Appl. No. 11/772,803", (filed Jul. 12, 2007).
Rosenberg, "U.S. Appl. No. 11/846,530", (filed Aug. 29, 2007).
Rosenberg, "U.S. Appl. No. 11/851,340", (filed Sep. 6, 2007).
Rosenberg, "U.S. Appl. No. 11/841,868", (filed Aug. 20, 2007).
Rosenberg, "U.S. Appl. No. 11/461,375", (filed Nov. 9, 2006).
Rosenberg, "U.S. Appl. No. 11/555,784", (filed May 24, 2007).
Rosenberg, "U.S. Appl. No. 11/563,610", (filed Jun. 28, 2007).
Rosenberg, "U.S. Appl. No. 11/697,706", (filed Aug. 16, 2007).
Rosenberg, "U.S. Appl. No. 11/618,858", (filed Jun. 14, 2007).
Rosenberg, "U.S. Appl. No. 11/676,298", (filed Jul. 5, 2007).
Rosenberg, "U.S. Appl. No. 11/697,732", (filed Apr. 8, 2007).
Rosenberg, "U.S. Appl. No. 11/744,879", (filed Sep. 20, 2007).
Rosenberg, "U.S. Appl. No. 11/775,314", (filed Jul. 30, 2007).
"Bodybug Calorie Management System", downloaded from www.ubergizmo.com/15/archives/2005/03/boddybug_calori.html on Jul. 9, 2007, (Mar. 18, 2005).
"www.fitlinxx.com", downloaded from www.fitlinxx.com/brand/about_tour3.htm on Jul. 9, 2007, (2003).
"YMCA", downloaded from www.ymcamidpen.org/textpage.php?b=2&p=fitlinxx on Jul. 10, 2007, (2003).
Demartini, Marilyn "Cyber Fitness", downloaded from www.physicalmag.com/articlesTemp.as?dept=14&articleID=1812 on Jul. 10, 2007, (Feb. 18, 2001).
Munro, Aria "eNewsChannels", downloaded from enewschannels.com/20070106enc582-025321.php on Aug. 5, 2007, (Jul. 1, 2007).
Oliver, Nuria et al., "Enhancing Exercise Performance through Real-time Phsiological Monitoring and Music: A User Study", *Proceedings of Pervasive Health 2006*. Innsbruck, Austria. Nov. 2006, et all=Lucas Kreger-Stckles,(Nov. 2006).
Betlyon, Jim "Omni Fitness Equipment Stores Integrate Physical Genius Online Fitness Tools", downloaded from www.physicalgenius.com on Aug. 5, 2007, (Apr. 19, 2000).
"Tune Your Run", *Apple Computer/Nike,* downloaded from www.apple.com on Jun. 28, 2006.
Nintendo, "Kirby's Tilt N' Tumble", downloaded from www.nintendo.com; Nov. 14, 2006; 2 pages, (Nov. 14, 2006),2 pages.
Cook, Perry et al., "Using DSP-Based Parametric Physical Syntheses Models to Study Human Sound Perception", *2003 IEEE Workshop on Applications of Signal Processing to Audio and Acoustics*, (2003).

"Yahoo media player", downloaded from www.yahoo.com on Sep. 19, 2006. Not admitted as prior art., (Sep. 19, 2006).
McKinney and Moelants, "Extracting the Perceptual Tempo from Music", *published at the ISMIR 2004 5th International Conference on Music Information Retrieval*, (2004).
"PCDJ Red Virtual Rack Module", by Visiosonic of Clearwater, FL. Downloaded from www.visiosonic.com on Jun. 27, 2006.
"Beat rates per minute", downloaded from www.bpmlist.com on Jun. 27, 2006. Lulu Publishing. ISBN 1-4116-4211-2.
Metzger, Christian et al., "FreeDigiter: A Contact-free Device for Gesture Control", *IEEE 8th International Symposium on Wearable Computers*, (Nov. 4, 2004).
"Jukebox Without Quarters", *Business Opportunities Weblog*, http://www.business-opportunities.bix/2007/03/30/jukebox-without-quarters/, cited Mar. 30, 2007, printed May 22, 2007,(May 30, 2007),2 pages.
Rosenberg, "U.S. Appl. No. 11/551,702", (filed Oct. 20, 2006).
Office Action from U.S. Appl. No. 11/298,797 dated Jan. 9, 2008.
Office Action from U.S. Appl. No. 11/341,021 dated Jan. 18, 2008.
"Total Immersion", *D'Fusion Software*, 2004.
Rosenberg, Louis "A force Feedback Programming Primer", *Immersion Corporation*, (1997).
Rosenberg, "U.S. Appl. No. 11/772,808", (filed Jul. 2, 2007).
Rosenberg, "U.S. Appl. No. 11/223,368", (filed Sep. 9, 2005).
Rosenberg, "U.S. Appl. No. 11/285,534", (filed Nov. 22, 2005).
Rosenberg, "U.S. Appl. No. 11/533,037", (filed Sep. 19, 2006).
Casey, Michael "MPEG-7 Sound-Recognition Tools", *IEEE Transactions on Circuits and Systems for Video Technology*, vol. 11, No. 6, Jun. 2001.
Shahinpoor, Mohsen "Electro-mechanics of ionoelastic beams as electrically-controllable artificial muscles", *SPIE Conference on Electroactive Polymer Actuators and Devices, SPEE* vol. 3669, 1999.
Oguro, K et al., "Polymer Electrolyte Actuator with Gold Electrodes", *SPIE Conference on Electroactive Polymer Actuators and Devices, SPEE* vol. 3669, 1999.
Rosenberg, "U.S. Appl. No. 11/298,434", (filed Dec. 9, 2005).
Rosenberg, "U.S. Appl. No. 11/427,320", (filed Jun. 28, 2006).
McKinney and Moelants, et al., "Deviations from the Resonance Theory of Temp Induction", *published at the Conference on Interdisciplinary Musicology*, et al=Dirk Moelands,(2004).
Rosenberg, "U.S. Appl. No. 11/626,355", (filed Jan. 23, 2007).
Rosenberg, "U.S. Appl. No. 11/561,981", (filed Nov. 21, 2006).
Rosenberg, "U.S. Appl. No. 11/539,598", (filed Jun. 7, 2007).
Rosenberg, "U.S. Appl. No. 11/535,417", (filed Sep. 26, 2006).
Murray, et al., "Underwater Teleroboticsa and Virtual Reality: A New Partnership", *NCCOSC RDT&E Division*; Jun. 20, 1996; pp. 1-10; San Diego, CA, (Jun. 20, 1996),1-10.
Rosenberg, "U.S. Appl. No. 11/610,499", (filed Dec. 13, 2006).
Rosenberg, "U.S. Appl. No. 11/619,607", (filed Jan. 3, 2007).
Rosenberg, "U.S. Appl. No. 11/341,948", (filed Jan. 27, 2006).
Rosenberg, "U.S. Appl. No. 11/683,394", (filed Mar. 7, 2007).
Rosenberg, "U.S. Appl. No. 11/344,613", (filed Jan. 31, 2006).
Rosenberg, "U.S. Appl. No. 11/682,874", (filed Mar. 6, 2007).
Rosenberg, "U.S. Appl. No. 11/278,531", (filed Apr. 3, 2006).
Rosenberg, "U.S. Appl. No. 11/697,704", (filed Apr. 6, 2007).
Sharper Image, "Laser Baseball", Item # PS115; downloaded from www.sharperimage.com on Dec. 9, 2005, 18 pages, (Dec. 9, 2005),18 pages.
Rosenberg, "U.S. Appl. No. 11/610,615", (filed May 10, 2007).
Rosenberg, "U.S. Appl. No. 11/677,045", (filed Feb. 20, 2007).
Rosenberg, "U.S. Appl. No. 11/619,605", (filed Jan. 3, 2007).
Rosenberg, "U.S. Appl. No. 11/610,494", (filed Dec. 13, 2006).
Rosenberg, "U.S. Appl. No. 11/562,036", (filed Nov. 21, 2006).
Reinhold, Ross "Applications of Myers-Briggs Type Indicator, Personality Type", available at http://www.personalitypathways.com/ last visited Jun. 15, 2007.
Rosenberg, "U.S. Appl. No. 11/539,598", (filed Oct. 6, 2006).
Rosenberg, Louis, U.S. Appl. No. 11/267,079, filed Nov. 3, 2005.
Rosenberg, Louis, U.S. Appl. No. 11/282,379, filed Nov. 18, 2005.
Rosenberg, Louis, U.S. Appl. No. 11/298,797, filed Dec. 9, 2005.
Rosenberg, Louis, U.S. Appl. No. 11/299,096, filed Dec. 9, 2005.
Rosenberg, Louis, U.S. Appl. No. 11/315,755, filed Dec. 21, 2005.
Rosenberg, Louis, U.S. Appl. No. 11/315,762, filed Dec. 21, 2005.

Rosenberg, Louis, U.S. Appl. No. 11/341,021, filed Jan. 27, 2006.
Rosenberg, Louis, U.S. Appl. No. 11/341,025, filed Jan. 27, 2006.
Rosenberg, Louis, U.S. Appl. No. 11/344,612, filed Jan. 31, 2006.
Rosenberg, Louis, U.S. Appl. No. 11/344,701, filed Jan. 31, 2006.
Rosenberg, Louis, U.S. Appl. No. 11/383,195, filed May 12, 2006.
Rosenberg, Louis, U.S. Appl. No. 11/383,197, filed May 12, 2006.
Rosenberg, Louis, U.S. Appl. No. 11/422,065, filed Jun. 2, 2006.
Rosenberg, Louis, U.S. Appl. No. 11/425,981, filed Jun. 22, 2006.
Rosenberg, Louis, U.S. Appl. No. 11/425,990, filed Jun. 22, 2006.
Rosenberg, Louis, U.S. Appl. No. 11/428,341, filed Jun. 30, 2006.
Rosenberg, Louis B., "Virtual Fixtures": Perceptual Overlays Enhance Operator Performance in Telepresence Tasks, PhD DIssertation, Stanford University, Jun. 1994.
Wu and Childers, Gender Recognition from Speech Part I: Coarse Analysis, 1991.
Wu and Childers, Gender Recognition from Speech Part II: Fine Analysis, 1991.
Brin and Page, The Anatomy of a Large-Scale Hypertextual Search Engine, Stanford University, 1998.
Martin, Keith Dana, Sound-source Recognition: A Theory and Computational Model, 1999.
Spohrer, Information in Places, IBM Systems Journal vol. 38 No. 4 (pp. 602-628), 1999).
Hayashi, J. et al., A Method for Estimating and Modeling Age and Gender Using Facial Image Processing, 2001.
Casey, Michael, MPEG-7 Sound Recognition Tools, IEEE Transactions on Circuits and Systems for Video Technology vol. 11 No. 6, 2001.
Schotz, Automatic prediction of speaker aqe using CART, 2003.
Castelli et al., Habitat Telemonitoring System Based on the Sound Surveillance, 2003.
Castrillon et al., Identity and Gender Recognition Using the ENCARA Real-Time Face Detector, CAEPIA, Nov. 2003.
Website, www.confluence.org, first visited in May 2005.
Website, www.wwmx.org, first visited in May 2005.
Office Action from U.S. Appl. No. 11/315,762 dated Jan. 29, 2008.
Office Action from U.S. Appl. No. 11/344,701 dated Jan. 24, 2008.
Office Action from U.S. Appl. No. 11/422,065 dated Jan. 28, 2008.
Office Action from U.S. Appl. No. 11/383,195 dated Mar. 19, 2008.
Office Action from U.S. Appl. No. 11/344,612 dated Apr. 8, 2008.
Anonymous, "Social Search", Wikipedia.com Jan. 23, 2008.
Ciger, et al., "The magic wand", *In: Proceedings of Spring Conference on Computer Graphics 2003*, Budmerice, Slovak Republic 2003, 132-8.
Finkelstein, Lev, "Placing Search in Context: The Concept Revisted", *Zapper Technologies* May 5, 2001.
Hernandez, Jose L. et al., "A New Instrumented Approach For Translating American Sign Language Into Sound And Text", *IEEE International Conference on Face and Gesture Recognition 2004*, Seoul, Korea, May 2004.
Hernandez-Rebollar, et al., "A Multi-Class Pattern Recognition System for Practical Finger Spelling Translation", *Proceedings of International Conference on Multimodal Interfaces, IEEE 2002* 2002, 185-190.
Kramer, J. et al., "The Talking Glove: Expressive and Receptive Verbal Communication Aid for the Deaf, Deaf-Blind, and Nonvocal", *SIGCAPH 39* Spring 1988, 12-15.
Rosenberg, U.S. Appl. No. "11/278,120", filed Oct. 5, 2006.
Sullivan, Danny, "Eurekster Launches Personalized Social Search", SearchEngineWatch.com Online Newsletter Jan. 24, 2004.
U.S.P.T.O., Office Action from U.S. Appl. No. 11/285,534 mailed Jul. 21, 2008.
U.S.P.T.O., Office Action from U.S. Appl. No. 11/267,079 mailed Jul. 17, 2008.
U.S.P.T.O., Office Action from U.S. Appl. No. 11/427,320 mailed Jul. 23, 2008.
U.S.P.T.O., Office Action from U.S. Appl. No. 11/341,021 mailed Aug. 14, 2008.
U.S.P.T.O., Office Action from U.S. Appl. No. 11/315,762 mailed Aug. 12, 2008.
U.S.P.T.O., Non-Final Office Action from U.S. Appl. No. 11/539,598 mailed Sep. 19, 2008.
U.S.P.T.O., Non-Final Office Action from U.S. Appl. No. 11/341,025 mailed Sep. 24, 2008.
U.S.P.T.O., Examiner Interview Summary for U.S. Appl. No. 11/246,050 mailed Sep. 30, 2008.
U.S.P.T.O., Non Final Office Action for U.S. Appl. No. 11/315,755 mailed Sep. 30, 2008.
U.S.P.T.O., Final Office Action from U.S. Appl. No. 11/383,195 mailed Oct. 15, 2008.
U.S.P.T.O., Non Final Office Action from U.S. Appl. No. 11/775,314 mailed Oct. 29, 2008.
U.S.P.T.O., Office Action from U.S. Appl. No. 11/282,379 mailed May 30, 2008.
U.S.P.T.O., Office Action from U.S. Appl. No. 11/298,797 mailed Jun. 25, 2008.
U.S.P.T.O., Office Action from U.S. Appl. No. 11/618,858 mailed Jul. 9, 2008.
U.S.P.T.O., Office Action from U.S. Appl. No. 11/246,050 mailed Jul. 9, 2008.
U.S.P.T.O., Notice of Allowance for U.S. Appl. No. 11/285,534 mailed Nov. 19, 2008.
U.S.P.T.O., Examiner Interview for U.S. Appl. No. 11/285,534 mailed Nov. 19, 2008.
U.S.P.T.O., Non Final Office Action for U.S. Appl. No. 11/610,499 mailed Dec. 19, 2008.
U.S.P.T.O., Non Final Office Action from U.S. Appl. No. 11/223,368 mailed Dec. 24, 2008.
U.S.P.T.O., Notice of Allowance for U.S. Appl. No. 11/246,050 mailed Jan. 8, 2009.
U.S.P.T.O., Non Final Office Action from U.S. Appl. No. 11/539,598 mailed Jan. 7, 2009.

* cited by examiner

SPATIALLY ASSOCIATED PERSONAL REMINDER SYSTEM AND METHOD

This application claims the benefit of U.S. Provisional Application No. 60/742,625, filed Dec. 5, 2005 which is incorporated in its entirety herein by reference.

The present invention is also related to the following co-pending U.S. patent applications, all of which are incorporated in their entirety herein by reference:

U.S. patent application Ser. No. 11/315,755, of Rosenberg, filed on Dec. 21, 2005, and entitled "METHOD AND APPARATUS FOR ACCESSING SPATIALLY ASSOCIATED INFORMATION";

U.S. patent application Ser. No. 11/344,701, of Rosenberg, filed on Jan. 31, 2006, and entitled "TRIANGULATION METHOD AND APPARATUS FOR TARGETING AND ACCESSING SPATIALLY ASSOCIATED INFORMATION";

U.S. patent application Ser. No. 11/383,195, of Rosenberg, filed May 12, 2006 and entitled "ENHANCED STORAGE AND RETRIEVAL OF SPATIALLY ASSOCIATED INFORMATION";

U.S. patent application Ser. No. No. 11/341,025, of Rosenberg, filed Jan. 27, 2006 and entitled "IMAGE-ENHANCED VEHICLE NAVIGATION SYSTEMS AND METHODS"; and U.S. patent application Ser. No. 11/425,981 of Rosenberg, filed Jun. 22, 2006, and entitled "PERSONAL CUING FOR SPATIALLY ASSOCIATED INFORMATION," which is a nonprovisional of U.S. Provisional Patent Application 60/724,469, of Rosenberg, filed Oct. 7, 2005 and entitled "PERSONAL CUING FOR SPATIALLY ASSOCIATED INFORMATION."

BACKGROUND

1. Field of Invention

Embodiments exemplarily described herein relate generally to accessing information based upon a user's geographic location.

2. Discussion of the Related Art

At the present time a number of emerging technologies have been developed to allow users to link informational content with geographic locations. Some early embodiments of such systems are described in the paper by Spohrer entitled Information in Places and published in IBM Systems Journal, vol. 38, No. 4, 1999 (p. 602-628) which is hereby incorporated by reference.

A number of other systems have been developed for accessing spatially associated information, the information being accessed based upon the then current location of a portable computing system as determined by one or more Global Positioning System (GPS) sensor local to a computing system. For example, U.S. Pat. No. 6,122,520 entitled SYSTEM AND METHOD FOR OBTAINING AND USING LOCATION SPECIFIC INFORMATION and hereby incorporated by reference, describes a system that uses Navstar Global Positioning System (GPS), in combination with a distributed network, to access location related information based upon GPS coordinates. In addition U.S. Pat. No. 6,819,267 entitled SYSTEM AND METHOD FOR PROXIMITY BOOKMARKS USING GPS AND PERVASIVE COMPUTING and hereby incorporated by reference, also describes a system for accessing location related information using GPS coordinates. In addition U.S. Patent Application Publication No. 2005/0032528 entitled GEOGRAPHICAL WEB BROWSER, METHODS, APPARATUS AND SYSTEMS and hereby incorporated by reference, also describes a system for accessing location related information using GPS coordinates.

A problem with such prior art systems is that simply tagging information by location by itself does not support the unique needs of users who want to leave personal reminders to themselves that trigger only upon entering and/or exiting a particular area that is relationally associated with the reminder. For example, simply tagging information by location does not address the fact that a user may wish to author a reminder and specifically assign the triggering of that reminder to the act of entering a defined physical area. Similarly, simply tagging information by location does not address the fact that a user may wish to author a reminder and specifically assign the triggering of that reminder to the act of entering a defined physical area and resetting the reminder such that it will not trigger again until the user has exited the defined area and then entered again. Similarly, simply tagging information by location does not address the fact that a user may wish to author a reminder and specifically assign the triggering of that reminder to the act of exiting a defined physical area. Similarly, simply tagging information by location does not address the fact that a user may wish to author a reminder and specifically assign the triggering of that reminder to both the acts of entering and exiting a defined physical area. Also, simply tagging information by location does not address the fact that a user may wish to leave a reminder that is only accessible by himself or herself and not accessible by other users. Also, simply tagging information by location does not address the fact that a user may wish to leave a reminder that will alert him or her only once upon entering a particular area. Also, simply tagging information by location does not address the fact that user may wish to have unique reminder options upon being presented to him or her upon the automatic triggering of a reminder. For example, a user may wish to be provided with the option of terminating the reminder upon automatic display such that it will be deleted and not trigger again. The user may also wish to be provided with the option of editing the reminder upon automatic display such that items can be added, removed, and/or changed. The user may also wish to be provided with the option of deferring the reminder such that it will trigger again after a defined amount of time if the user remains within the associated physical area. The user may also wish to be provided with the option of requesting a last chance with respect to the reminder such that it will automatically trigger again just as the user leaves the defined area and thereby give him or her a last chance to act on the reminder before leaving the area. Also, simply tagging information by location does not address the fact that a user may wish to leave a reminder that is relationally associated with a particular selected establishment or type of establishment.

It was a recognition of these and other shortcomings of the prior art that provided the impetus for the embodiments discussed herein below.

SUMMARY

Several embodiments exemplarily described herein address the needs above as well as other needs by providing spatially associated personal reminder systems and methods.

One embodiment exemplarily described herein can broadly be characterized as a spatially associated personal reminder method that includes receiving current locative sensor data, the locative sensor data identifying a physical location of a user's portable computing device; accessing a reminder database containing a personal reminder, wherein each personal reminder comprises reminder content and a trigger area relationally associated with the personal reminder, the reminder content identifying one or more tasks the user intends to complete in the future; comparing the physical location identified within the current locative sensor data with a boundary of the trigger area that is relationally associated with the reminder content of the personal reminder; determining whether a trigger event associated with the personal reminder has occurred based upon the comparing; and displaying the reminder content relationally associated with the trigger area to the user via a display of the portable computing device when the trigger event is determined to have occurred.

Another embodiment exemplarily described herein can broadly be characterized as a spatially associated personal reminder system that includes a portable computing device comprising reminder circuitry adapted to: receive current locative sensor data, the locative sensor data identifying a physical location of a user's portable computing device; access a reminder database containing a personal reminder, wherein each personal reminder comprises reminder content and a trigger area relationally associated with the personal reminder, the reminder content identifying one or more tasks the user intends to complete in the future; compare the physical location identified within the current locative sensor data with a boundary of the trigger area that is relationally associated with the reminder content of the personal reminder; determine whether a trigger event associated with the personal reminder has occurred based upon the comparing; and display the reminder content relationally associated with the trigger area to the user via a display of the portable computing device when the trigger event is determined to have occurred.

BRIEF DESCRIPTION OF THE DRAWINGS

The above and other aspects, features and advantages of several embodiments as exemplarily described herein will be more apparent from the following more particular description thereof, presented in conjunction with the following drawings.

Figure 1:
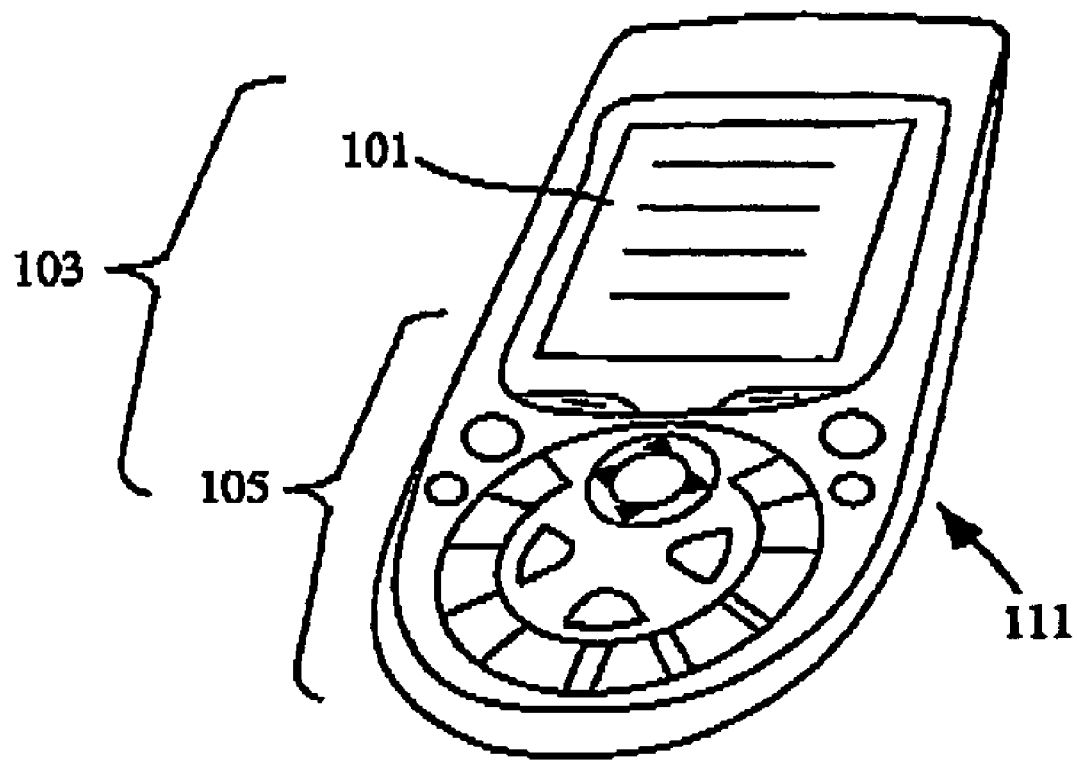
FIG. 1 illustrates one embodiment of a portable computing device incorporated within a spatially associated personal reminder system.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments as exemplarily described herein. Also, common but well-understood elements that are useful or necessary in a commercially feasible embodiment are often not depicted in order to facilitate a less obstructed view of these various embodiments as exemplarily described herein.

DETAILED DESCRIPTION

The following description is not to be taken in a limiting sense, but is made merely for the purpose of describing the general principles of exemplary embodiments. The scope of the invention should be determined with reference to the claims.

People use a variety of techniques for reminding them of pending tasks that must be completed in their lives. For example, many people write to-do lists to remind themselves of the various things they need to get done, often crossing off items as they are completed. With the advent of handheld personal computing devices, users are now able to keep to-do lists as digital files they store and access on electronic devices they keep with them. Such devices may include PDAs, cell phones, personal media players, and other portable computing devices. While such paper reminders and electronic reminders are useful, there are some tasks in a user's life that he or she may wish to be reminded of at times when he or she enters and/or exits a particular area in the real physical world. For example, a user may wish to be reminded that he or she needs to pick up laundry from the Dry Cleaners at times when he or she enters an area near the physical location of the dry cleaners establishment. Similarly, a user may wish to be reminded to buy light bulbs the next time he or she enters an area near a store that sells light bulbs. Similarly, the user may wish to be reminded to close his garage door each time he or she leaves an area that is associated with his or her house.

Embodiments exemplarily described herein address the shortcomings associated with the prior art and address the functionality described above by enabling methods and systems useful to users who wish to author a personal digital reminder that automatically trigger based upon the user physically entering and/or physically exiting one or more physical areas that the user relationally associates with the reminder. For example, numerous embodiments exemplarily described herein provide methods and systems that enable a user to author a personal digital reminder that automatically triggers an alert and/or is automatically displayed when the user physically enters a particular spatial area in the real physical world. The displayed reminder may be optionally terminated, deferred, edited, and/or set to trigger again upon exiting the area, by the user engaging a user interface. Numerous embodiments exemplarily described herein provide methods and systems that enable a user to author a personal digital reminder that automatically triggers when the user physically exits a particular spatial area in the real physical world that the user has relationally associated with the reminder. Numerous embodiments exemplarily described herein also provide methods and systems that enable a user to relationally associate a reminder to a particular establishment and/or type of establishment. For example, a user may relationally associate a particular personal reminder to his or her home, his or her work, to his or her favorite grocery store, or to all grocery stores. Numerous embodiments exemplarily described herein also provide methods and systems by which a user may select a particular type of product and automatically relationally associate a reminder to all establishments that sell that type of product. Numerous embodiments exemplarily described herein also provide methods and systems enabling a portable computing device that is carried on the person of the user to trigger an alert and/or display the personal digital reminder based upon a user entering and/or exiting the physical area associated with the personal digital reminder. These and other embodiments will be described in greater detail below.

As defined herein, the phrase "personal digital reminder" refers to a store of digital data that may include information such as text, audio, images, graphics, and/or video, that describes or otherwise indicates one or more pending tasks that the user intends to perform in the future. For example, the personal digital reminder may include a text file that includes simple phrases such as "walk the dog" or "buy milk" or "lock the shed" or "get gas" or "buy flowers." In some cases, the action verb may be implicit in the fact that the personal digital reminder relates to a pending task. For example, the text file may simply include the word "milk" because it is understood by the user who authored the reminder that the task required is to buy milk. Generally, however, the text file includes enough information such that the user who authored the reminder is reminded of the pending task that he or she is thinking of to get done. In some embodiments, the personal digital reminder may be a voice message left by recording and storing a digital audio file. For example, the user may record a digital audio file of himself or herself saying "walk the dog" or "buy milk" and thereby create a personal digital reminder that includes audio voice content. The personal digital reminder may also include video of the user. For example, the user may record a video file of himself or herself saying "walk the dog" and thereby create a personal digital reminder that includes video content.

In addition to including text, audio, images, graphics, and/or video that indicates one or more pending tasks that the user intends to perform in the future, the personal digital reminder may also include a relational association to one or more physical areas in the real physical world. Such areas are defined such that the reminder will be triggered (i.e., an alert will be issued to user and the reminder will be displayed) when it is determined that the user has just entered and/or exited the area are referred to herein as "associated trigger areas."

For the sake of brevity, the phase personal digital reminder will often be referred to herein simply as the "reminder". Similarly, the phrase "associated trigger area" will often be referred to herein as "trigger area" or more simply "area". Also, as used herein the pending future tasks that are authored by the user and stored as text, audio, images, and/or video files within a personal digital reminder will be referred to herein simply as the "reminder content" of the reminder. Thus, a personal digital reminder is a store of reminder content that is relationally associated with a trigger area in the real physical world.

The personal digital reminder may also include parameters such as flags and variables that describe how and when the reminder should be triggered as well as the current status of the reminder. For example, the parameters describe if the reminder should be triggered upon the user physically entering the trigger area, exiting the trigger area, or both entering and exiting the trigger area. Generically, a user's entry into a trigger area and exit out of a trigger area is also referred to as a "trigger event". Specific examples of such flags and variables will be described in greater detail below.

In general, the set of personal digital reminders that have been authored by the user and relationally associated with one or more trigger areas is stored in a database referred to herein as a "reminder database". The reminder database is accessible by a portable computing device local to the user. Accordingly, a spatially associated personal reminder system includes a portable computing device that has access to the reminder database and runs software adapted to automatically alert the user to appropriate reminders based upon changes in physical location of the user in combination with how the reminders have been defined by the user.

Generally, the spatially associated personal reminder system may be embodied as a portable computing device that is carried on the person of a user. The personal computing device stores one or more personal digital reminders within a memory contained therein. In some embodiments, the reminders may be accessed by the portable computing device from a remote server over a wireless communication link. The portable computing device also includes a locative sensor that provides data indicative of the current physical location of the portable computing device within the real physical world (i.e., location information). The locative sensor generally provides spatial coordinates that identify the location of the portable computing device within the real physical world. The locative sensor may take a variety of forms, although the many embodiments described herein employ a GPS transducer as the locative sensor. The GPS transducer provides latitude and longitude coordinates that identify the location of the device upon the physical surface of the earth.

In many embodiments, the user's entry into or exit out of a trigger area associated with a particular personal digital reminder is determined based upon a detected GPS location of the user using a GPS transceiver accessible by a portable computer device being used by the user, the GPS location being compared to the boundary of the trigger area that has been relationally associated with the digital reminder. Thus, the occurrence of a trigger event can be determined based upon a relationship between the detected GPS location of the user and the boundary of the trigger area. Thus, the spatially associated personal reminder system generally includes a portable computing device that has a locative sensor proximal to it, such as a GPS transducer, and an optional link to a remote server. Numerous embodiment exemplarily described herein provide enhanced methods and systems for storing and accessing personal reminders and for triggering such reminders based upon the changes in physical location of the user of the portable computing device. More specifically, the embodiments exemplarily described herein provide methods and systems by which a user may create a personal reminder, relationally associate that personal reminder to a particular area within the real physical world, and configure the reminder to trigger based upon an entry and/or exit of the particular area. Moreover, embodiments exemplarily described herein provide software adapted to automatically trigger the personal reminder based upon the defined parameters such that the reminder is displayed to the user when the user enters and/or exits the trigger area. In some such embodiments, the portable computing device includes software adapted to ensure that a reminder is only displayed to a user once upon an entry of a trigger area.

In addition, embodiments exemplarily described herein provide methods and systems by which a user, upon viewing a triggered personal reminder, is provided with a reminder option of terminating the reminder such that it will be deactivated and/or removed from the reminder database.

In addition, embodiments exemplarily described herein provide methods and systems by which a user, upon viewing a triggered personal reminder, is provided with a reminder option of deferring the reminder such that it will not trigger again for some amount of time. In some of such embodiments, the amount of time is a default amount of time. In some of such embodiments, the amount of time is set by the user. In some of such embodiments, the reminder only triggers if the user remains within the trigger area for the duration of the defer time.

In addition, embodiments exemplarily described herein provide methods and systems by which a user, upon viewing a triggered personal reminder, is provided with a reminder option of editing the reminder such that content items may be added, removed, and/or changed by the user.

In addition, embodiments exemplarily described herein provide methods and systems by which a user, upon viewing a triggered personal reminder, is provided with a reminder option of requesting a last chance with respect to the reminder such that it will automatically trigger again just as the user leaves the defined area and thereby give him or her a last chance to act on the reminder. In this way, the user can view a reminder, remove it from his or her screen, but be assured that upon leaving the area he will be reminded again to ensure he did not forget to take the desired action.

In addition, embodiments exemplarily described herein enable a user to leave a reminder that is relationally associated with a particular selected establishment or type of establishment by selecting an establishment from a user interface upon authoring the reminder. In some of such embodiments, the user specifies an establishment and/or a type of establishment and an associated area or areas is accessed from a database (e.g., an establishment database) that links establishments to physical areas.

In addition, embodiments exemplarily described herein enable a user to leave a reminder that is relationally associated with a particular selected product or service by selecting a product or service from a user interface upon authoring the reminder. In some of such embodiments, the user specifies a product or service and an associated area or areas is accessed from a database (e.g., an establishment database) that links products or services to physical areas that have establishments that sell or provide such products or services.

In addition, embodiments exemplarily described herein provide an enhanced method of determining if a user has entered and/or exited a trigger area associated with a particular location related reminder. In this enhanced method, a different boundary region is used for determining entry into a particular trigger area as compared to the boundary region used for determining exit of that trigger area, the entry boundary being smaller than the exit boundary. In this way, the software may more robustly determine if the user has entered and/or exited the trigger area, especially at times when the user may be mulling about near a boundary and/or at times when the locative sensor data includes a certain level of signal noise.

As mentioned above, embodiments exemplarily described herein provide personal digital reminders by enabling a portable computing device that is carried on the person of the user to trigger an alert and/or display a reminder based upon a user entering and/or exiting a physical area that has been relationally associated with the reminder. Accordingly, the spatially associated personal reminder system described herein may include a portable computing device.

FIG. 1 illustrates one embodiment of a portable computing device incorporated within a spatially associated personal reminder system.

As used herein, a "portable computing device" broadly refers to any mobile computing device that may be carried about or otherwise moved about by the user as he or she traverses a real physical space, including but not limited to a cell phone, a personal digital assistant (PDA), a portable gaming system, a portable media player, a laptop computer, a wristwatch with a computer processor, a wearable computer, or the like. A typical portable computing device 111 has a wireless communication connection to a network such as the Internet although such a connection is not required for all embodiments described herein. The portable computing device 111 generally includes a memory for storing one or more personal digital reminders. These reminders are generally stored within a reminder database that may be accessed from a remote server or stored entirely within the memory of the portable computing device. The portable computing device 111 generally includes a display 101 for presenting personal digital reminders to users at appropriate moments, said displayed including visual, audio, and/or tactile presentation capabilities. The personal computing device may also include hardware and/or software adapted to present alerts to the user, said alerts being used to gain the user's attention when a personal digital reminder is triggered. The alerts produced in accordance with embodiments exemplarily described herein may be visual, aural, and/or tactile in nature. The portable computing device 111 generally includes a locative sensor that provides locative sensor data indicative of the current physical location of the portable computing device 111 within the real physical world. The locative sensor generally provides spatial coordinates that identify the location of the portable computing device 111 within the real physical world. The locative sensor may take a variety of forms, although many embodiments employ a GPS transducer as the locative sensor. The GPS transducer provides latitude and longitude coordinates (and optionally altitude data) that identify the location of the device upon the physical surface of the earth. The portable computing device 111 also includes software running upon a processor of portable computing device, the software operative to manage the personal digital reminders and trigger appropriate reminders based upon the changes in location of the user within the real physical world as detected by the locative sensor. The portable computing device 111 also includes a user interface 103 supported by hardware and software for enabling a user to create, edit, and manage personal digital reminders as well as for enabling a user to associate reminder content with particular spatial areas within the real physical world.

Referring to FIG. 1, portable computing device 111 includes within it a number of components including a local processor, a local memory, a locative sensor, a display 101, a user interface 103, hardware and software for generating alerts, and reminder circuitry adapted to manage and trigger reminders based upon the changes in physical location of the user as he or she moves the portable computing device 111 about the real physical world. As used herein, the term "circuitry" refers to any type of executable instructions that can be implemented, for example, as hardware, firmware, and/or software, which are all within the scope of the various teachings described. The user interface 103 includes the aforementioned display 101 in addition to user input devices (e.g., buttons) 105. In one embodiment, at least a portion of the reminder database described above may be provided within the local memory of the portable computing device 111. In another embodiment, at least a portion of the reminder database described above may be supported remotely (e.g., by a reminder server as will be discussed below).

In one embodiment, the reminder content of each personal digital reminder may be stored in the local memory of the portable computing device 111. They may be entered directly into the portable computing device 111 by the user by manipulating the user interface 103 of the portable computing device 111. They may be entered into another computer (e.g., a personal computer, not shown), and downloaded into the portable computing device 111 over a wired or wireless link. Or they may be downloaded from a remote server (not shown) over a wired or wireless link. In some embodiments, the user keeps a database of his or her personal digital reminders on a remote server and downloads them into his or her portable computing device 111 over a wireless link when the portable computing device 111 is active. In this way, the user may use a plurality of portable computing devices and always access his personal digital reminders from the remote server, regardless of which device he is using. However, many embodiments do not require a remote server. In such embodiments, personal digital reminders may be stored within the local memory of the portable computing device 111. This data includes the content described above, including any text, graphics, audio, and/or video files associated with each personal digital reminder.

In one embodiment, associated trigger areas of each personal digital reminder may be stored in the local memory of the portable computing device 111. As will be described in greater detail below, trigger areas may be defined in a variety of ways—for example, by indicating a set of coordinates that describes the boundaries of the area. Alternately, trigger areas may be defined as a set of coordinates of a reference location and additional mathematical information that describes the boundaries with respect to the reference location. For example, if the trigger area is circular it may be defined as a set of coordinate describing the center of the circle and a radius that describes the size of the circle and a parameter indicating that the area is a circle. With those parameters (e.g., the coordinates of the center, the radius, and the fact that it is a circular area), the boundaries of the physical area in the real physical world may be fully described. For other shapes, additional parameters may be required such as orientation information that describes how the shape is oriented as well as other parameters to describe the boundaries. In this way square, rectangle, ellipse, irregular polygon, and other shaped areas may be defined that described the spatial boundaries of an area within the real physical world. In some embodiments, the trigger area may be a three dimensional volume, for example, a sphere region or a cube region.

In one embodiment, flags and other variables that describe how and when the reminder should be triggered (as well as the current status of the reminder) of each personal digital reminder may be stored in the local memory of the portable computing device 111. As described above, the flags and other variables (collectively referred to as "parameters") describe if the reminder should be triggered (i.e., if the trigger event should occur) upon the user physically entering the trigger area, exiting the trigger, or both entering and exiting the trigger area. These parameters may be represented in many ways. One method is to include two flag variables within the data store of the personal digital reminder, the flag variables including an Entry_Trigger_Flag and an Exit_Trigger_Flag. Each flag may be represented by a binary variable and thereby store the value 0 or 1. If the Entry_Trigger_Flag is set to 1, then the reminder will trigger upon the user physically entering the area. If the Entry_Trigger_Flag is set to 0 it will not. If the Exit_Trigger_Flag is set to 1, then the reminder will trigger up the user physically exiting the area. If the Exit_Trigger_Flag is set to 0 it will not. Thus, based upon how these two flag variables are set, the personal digital reminder may be set to trigger upon entering, exiting, or both entering and exiting the trigger area.

As mentioned previously, a user interface 103 is provided upon the portable computing device 111 (or other computing device on which the reminder is authored) that enables the user to select the trigger status of the reminder. The user, for example, may select options from a displayed menu upon the portable computing device 111. Based upon the options selected, the reminder circuitry automatically sets the appropriate Exit_Trigger_Flag and Exit_Trigger_Flag values for that reminder stored in memory. For example, if a user authoring a particular reminder selected an item from a menu (or other common user interface metaphor) that indicated that the reminder should trigger both upon the user entering and exiting the defined trigger area, the reminder circuitry will automatically set the Entry_Trigger_Flag to 1 and the Exit_Trigger_Flag to 1 in the store of data that represents the reminder.

A personal digital reminder is thus a store of digital data that includes reminder content, one or more associated trigger areas, and a set of parameters that described how the reminder will be triggered (including information that indicates if it will trigger upon the user entering, exiting, or both entering and exiting the trigger area). Additional parameters may also be included that described the status of the reminder. For example, in many embodiments an Entry_Status_Flag is stored, the entry status flag indicating if the user is currently inside a trigger area that has been relationally associated with a particular personal digital reminder. For example, the system is often configured such that the Entry_Status_Flag is set to 1 when the user is physically present within a trigger area associated with the reminder, and set to 0 when the user is not physically present within a trigger area associated with the reminder.

In addition, a Defer_Time parameter may be stored and associated with each reminder, the defer time parameter (also referred to herein as a "defer timer") indicating the amount of time that must elapse before a deferred digital reminder may be triggered again. This process will be described in detail below. In many embodiments, the Defer_Time is an integer variable that stores the number of seconds in the assigned Defer_Time. The Defer_Time may be set by the user engaging a user interface described in greater detail below. A default Defer_Time may also be used if not specifically set by the user. Because not all reminders will have the defer feature enabled, the parameters may include a flag that indicates if a particular reminder has been enabled with the Defer feature. For example, a Defer_Status_Flag may be defined as a binary variable that indicates that the reminder has been deferred by the user. If the flag is set to 1, it indicates the feature has been enabled. If the flag is set to 0, it indicates that the reminder has not been deferred by the user.

Thus, a personal digital reminder is a store of data that includes, reminder content that embodies the information that the user will be reminded of, one or more associated trigger areas that is relationally associated with the reminder content, and a set of parameters that described how the reminder will be triggered as the user enters and/or exits the one or more trigger areas, and additional parameters that indicate certain status information about each reminder. The personal digital reminder that is authored by the user may be stored in a variety of data structures. In general, the data structure that stores the set of currently defined personal digital reminders along with their associated trigger areas and parameters is referred to herein as the reminder database. One example data structure for the reminder database is partially described below. This particular embodiment only allows for circular trigger areas and thus, does not include parameters and values for other shapes. This should not limit the scope of the invention to circular trigger areas for it is provided merely for simple illustrative purposes. The data structure is represented symbolically as follows:

```
reminder[ID].Content_Pointer
reminder[ID].latitude_coordinate[i]
reminder[ID].longitude_coordinate[i]
reminder[ID].radius[i]
reminder[ID].Entry_Trigger_Flag
reminder[ID].Exit_Trigger_Flag
reminder[ID].Entry_Status_Flag
reminder[ID].Defer_Status_Flag
reminder[ID].Defer_Time
reminder[ID].Last_Chance_flag
```

The exemplary data structure described above supports some number n of different personal digital reminders wherein ID is a unique identification index number between 1 and n for each reminder. Thus, if a user created 10 different reminders and stored them in memory, each can be accessed based upon the index number. Reminder[5] for example, refers to the data for the fifth reminder in the reminder database. Reminder[3] refers to the third reminder in the reminder database. In the general case, the reminder of identification number ID can be accessed by referring to Reminder[ID].

Using this data structure, each reminder may be relationally associated to particular reminder content using a relational pointer. For example, the pointer for the reminder with ID=5 is stored in reminder[5].Content_Pointer. This pointer may, for example, point at the memory location of a stored digital file that contains the text, audio, image, and/or video content of the reminder of ID=5.

In addition to linked content, each reminder may have a plurality of associated trigger areas associated with it from 1 to i. In this particular embodiment, each of these trigger areas is a circle with a center coordinate (as a longitude and a latitude) and a radius. Thus, for example, a reminder of ID=3 may have two trigger areas relationally associated with it. These areas might be defined in memory as follows:

```
reminder[3].latitude_coordinate[1] = 37o25'38.18" N
reminder[3].longitude_coordinate[1] = 122o04'49.90" W
reminder[3].radius[1] = 100 ft
reminder[3].latitude_coordinate[2] = 37o25'38.05" N
reminder[3].longitude_coordinate[2] = 122o04'49.92" W
reminder[3].radius[2] = 60 ft
```

In addition, each reminder has flags associated with it that indicates if the reminder should trigger upon a suer entering an associated trigger area, upon exiting an associated trigger area, or both. These are represented by reminder[ID].Entry_Trigger_Flag and reminder[ID].Exit_Trigger_Flag which are both binary values as described previously. If for example, reminder ID=4 is defined such that it will trigger the reminder when a user enters its associated area(s) but not trigger the reminder when the user exits its associated area(s), the data structure would be defined as follows:

```
reminder[ID].Entry_Trigger_Flag = 1
reminder[ID].Exit_Trigger_Flag = 0
```

The other parameters in the data structure above are defined similarly with respect to their respective variable names. For example, reminder[ID].Entry_Status_Flag stores a binary value indicating if the user is currently within a trigger area associated with that reminder. reminder[ID].Defer_Status_Flag stores a binary value indicating if the user has recently deferred that reminder for some amount of time. reminder[ID].Defer_Time stores that amount of time (in seconds) if the reminder has been deferred by the user. And reminder[ID].Last_Chance_Flag is a binary value indicating if the user has requested a last chance trigger for that reminder.

In some embodiments, additional parameters may be associated with each reminder, further restricting the conditions under which the reminder will trigger. For example, in some embodiments, a reminder may also be associated with a temporal trigger condition, the temporal trigger condition defining a range of times during which the reminder may trigger. This may be useful for reminders that are associated with establishments that have certain business hours. In this way, a temporal trigger condition may be used to restrict the triggering of such a reminder to time periods that fall within the business hours of the particular establishment. In some embodiments, a reminder may be associated with a directional trigger condition, the directional trigger condition defining a direction of motion of the user, or range of directions of motion of the user, that must be met for the reminder to trigger. In this way, a reminder can be defined such that it triggers only when a user enters a particular trigger area while moving in a particular direction or moving within a particular range of directions. Similarly, a reminder can be defined using such directional trigger condition parameters such that it triggers only when a user exits a particular trigger area while moving in a particular direction or moving within a particular range of directions. In some embodiments, a reminder may be associated with a facing direction trigger condition, the facing direction trigger condition defining a direction or range of directions that the user must be facing for the reminder to trigger.

For embodiments that include a temporal trigger condition, the portable computing device generally includes and uses clock functionality to determine if a temporal trigger condition is met by the user upon entering or exiting a trigger area. For embodiments that include a directional trigger condition, the portable computing device generally stores a time history of locative values and uses this time history to determine if the user is moving in a required direction upon entering or exiting a trigger area. For embodiments that include a facing direction trigger condition, the portable computing device may employ a directional sensor, for example a magnetometer, that is incorporated within the device or in communication with the device that determines a facing direction for the user and employs this facing direction to determine if the user is facing in a required direction upon entering or exiting a trigger area. In these ways, the reminders exemplarily described herein may be configured such that the user is alerted to the reminder based upon the spatial location of the user meeting certain locative requirements in combination with additional restrictive requirements being met such as temporal and/or directional requirements.

Figure 2:
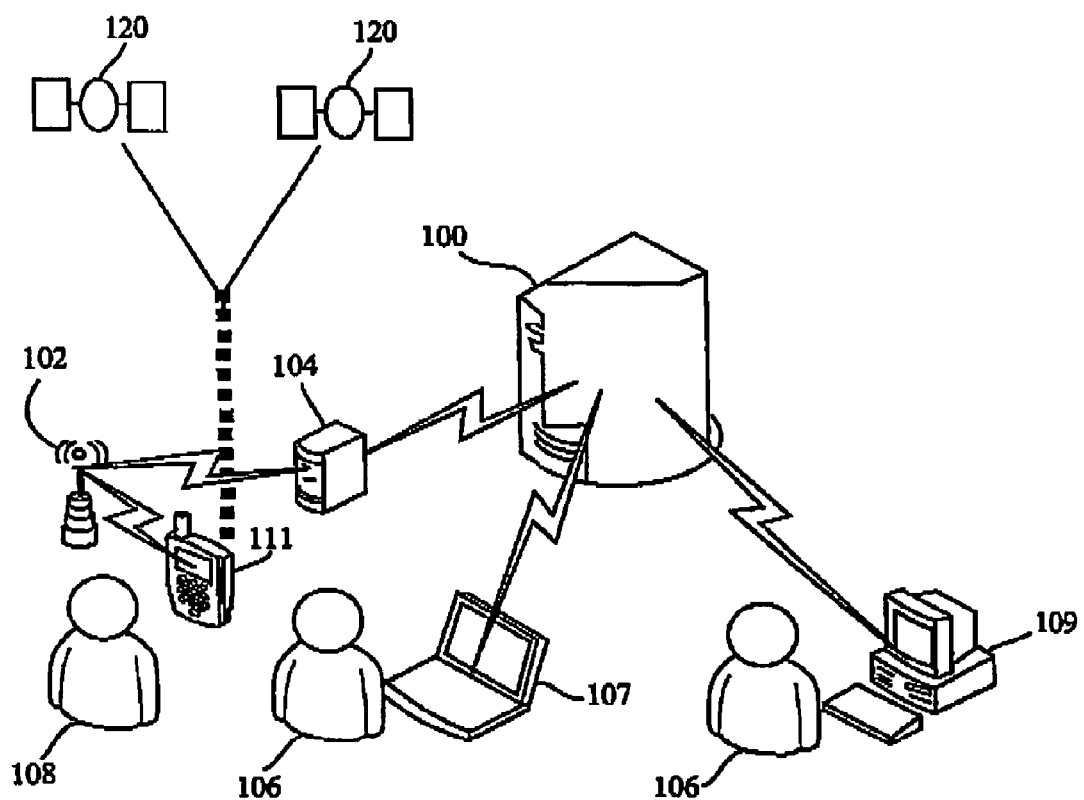
FIG. 2 illustrates a schematic representation of one embodiment of a spatially associated personal reminder system.

FIG. 2 illustrates a schematic representation of one embodiment of a spatially associated personal reminder system.

Referring to FIG. 2, an exemplary configuration of the spatially associated personal reminder system includes the portable computing device 111 that is kept with the user 108 as he or she moves about the real physical world. The portable computing device 111 has a locative sensor within it (or connected to it) such that it can track its current location within the physical world with accuracy. In many embodiments, the locative sensor is a GPS transducer. The GPS transducer determines spatial location by receiving data from a plurality of satellites 120 orbiting the earth. Based upon this data the GPS transducer quickly determines the current spatial location of the portable computing device 111 with a high degree of accuracy. In some embodiments, portable computing device 111 includes a wireless transmitter and receiver for communication with an external server 100. In such embodiments, the reminder server 100 may support certain reminder functionality by storing personal digital reminders that may be downloaded by the portable computing device 111 and then stored locally and/or by storing other information that helps the user correlate reminders to particular locations within the real physical world. For example, the reminder server 100 may store reference information that relates certain establishments and/or types of establishments to certain locations and/or areas within the real physical world. In some embodiments, the reminder server 100 may store reference information that relates certain products or services to the location and/or area of certain establishments that provide such products or services. That said, the reminder database that is used by the portable computing device 111 is generally stored local to the portable computing device 111 and only uses the optional remote server 100 for occasional updates of reminder information.

Thus, the spatially associated personal reminder system shown in FIG. 2 can be characterized as a computer moderated system that enables a portable computing device 111 to provide alerts to a user when he or she enters a physical area associated with a personal digital reminder and/or when he or she exits a physical area relationally associated with a personal digital reminder. A particular reminder may be configured such that it triggers an alert to a user only upon entering an associated area, only upon exiting an associated area, or both upon entering and exiting as associated area. The alert is provided to user 106 as an audible stimulus imparted through audio display hardware, and/or as a tactile stimulus imparted through tactile display hardware, and/or as a visual stimulus imparted through visual display hardware. The primary function of the alert is to gain the users attention such that he or she knows that a reminder has been triggered. Once the alert is imparted the user may look upon the screen and/or perform some other action to review the content of the reminder itself. Upon viewing the contents of the reminder, the user is automatically provided with reminder options by which the reminder may be terminated, deferred, reset, last chanced, and/or edited, as will be described in greater detail below. The reminder circuitry that is supported by the portable computing device 111 accesses the local reminder database, accesses the locative sensor, determines if alerts should be triggered, and provides the aforementioned reminder options to the user. In one embodiment, the reminder circuitry is provided as software that runs upon one or more processors local to the portable computing device 111. The reminder circuitry is also operative to allow a user to create (author) new reminders and associate those reminders with user selected areas in the real physical world and indicate if the authored reminder should trigger upon entering the area, exiting the area, or both entering and exiting the selected area.

To perform the reminder triggering functions described herein, the portable computing device 111 contains within it and/or is connected to one or more locative sensors. The reminder circuitry is operative to access data from the one or more locative sensors to determine a current position of the user at frequent points in time. The reminder circuitry may also be operative to store a time history of locative sensor data to determine the direction of motion of the user at various points in time. In many embodiments, the locative sensors include one or more GPS transducers that provide current spatial location information for the portable computing device 111 by receiving data from orbiting satellites 120. The GPS transducer is operative to provide latitude, longitude, and altitude coordinates to the reminder circuitry. The locative sensors may also include other sensors such as a directional sensor such as a magnetometer and/or accelerometer that provides directional data. In general, the reminder circuitry accesses the locative sensor data at a rapid and regular interval such that it has access to substantially current locative information for the user in possession of the portable computing device. The current location information generally includes spatial coordinates (such as latitude and longitude) identifying the geographic location of the user. The current location information may also include altitude, orientation, speed, and direction of motion information.

As also shown in FIG. 2, portable computing devices intended for use with the spatially associated personal reminder system may include a communication link, generally a wireless communication link, to a network such as the Internet and/or cellular network that enable the portable computing device 111 to exchange data with the reminder server. Embodiments of the spatially associated personal reminder system and associated methods can be characterized as a managed service (e.g., in an ASP model) using a reminder server 100, which is connected or connectable to one or more networks. For illustrative purposes, the reminder server 100 is illustrated as a single machine, but one of ordinary skill will appreciate that this is not a limitation of the invention. More generally, the service may be provided by an operator using a set of one or more computing-related entities (systems, machines, processes, programs, libraries, functions, or the like). In a typical implementation, the service comprises a set of one or more computers. A representative machine is a network-based server running commodity (e.g. Pentium-class) hardware, an operating system (e.g., Linux, Windows, OS-X, or the like), an application runtime environment (e.g., Java, ASP) and a set of applications or processes (e.g., Java applets or servlets, linkable libraries, native code, or the like, depending on platform), that provide the functionality of a given system or subsystem. The service may be implemented in a standalone server, or across a distributed set of machines. Typically, a server connects to the publicly-accessible Internet, a corporate intranet, a private network, or any combination thereof, depending on the desired implementation environment. As illustrated FIG. 2, the reminder server 100 is also in communication with a mobile service provider (MSP) 102 through a gateway, such as SMS gateway 104.

As also illustrated in FIG. 2, one or more users 108 or 106 may register for the service, typically by using the portable computing device 111 or some other machine such as a portable computer 107 or a personal computer 107. When a portable computer 107 or personal computer 109 is used, registration is initiated by an end user opening a Web browser to the operator's Web site registration page (or set of registration pages). When a portable computing device 111 is used, registration may be initiating through a mini-browser or other similar interface. These techniques are merely representative, as any convenient technique (including, without limitation, email, filling out and mailing forms, and the like) may be used. Thus, in the illustrated embodiment, users register with the reminder server 100 (or set of servers) either through Internet connections from personal computers, or via remote registration through a mobile device.

Figure 3:
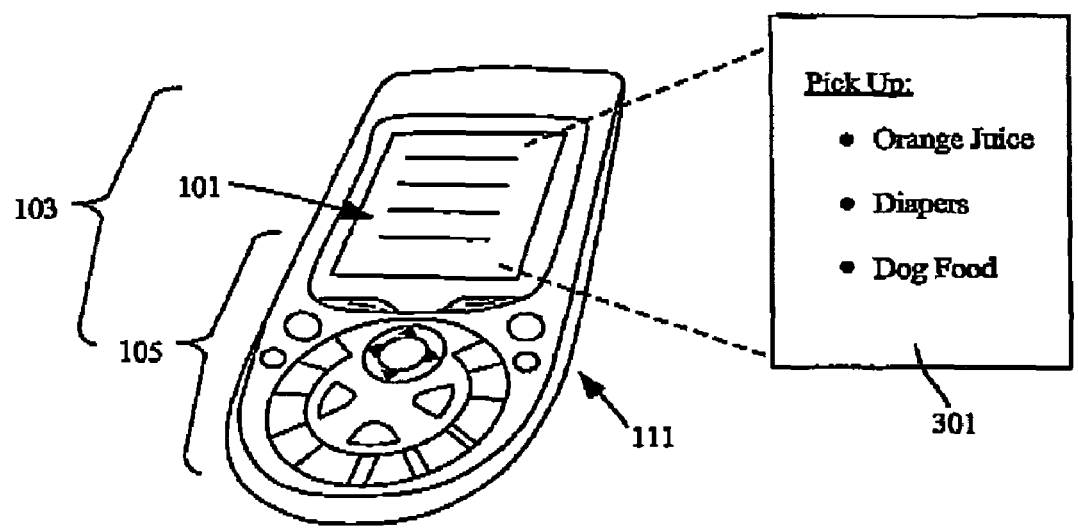
FIG. 3 illustrates one embodiment of a portable computing device incorporated within a spatially associated personal reminder system in which an exemplary personal digital reminder is displayed in the form of a text-based shopping list.

FIG. 3 illustrates one embodiment of a portable computing device incorporated within a spatially associated personal reminder system in which an exemplary personal digital reminder is displayed in the form of a text-based shopping list.

As illustrated in FIG. 3, a portable computing device 111, configured with appropriate hardware and software to support embodiments of spatially associated personal reminder systems and methods exemplarily disclosed herein, may take the form of a handheld device such as a cell phone or PDA and includes display functionality and user interface controls. Such a portable computing device 111 supports reminder circuitry and is thereby operative to track the user's location and automatically trigger reminder alerts and/or display reminders upon the user entering and/or exiting associated trigger areas. The portable computing device 111 includes a user interface 103 having a display 101 and user input devices 105. In typical embodiments, the user interface enabled upon the display that allows users to enter information and/or make selections to configure and/or direct the reminder circuitry. In addition, the display 101 is also used to present aural and/or visual contents of reminders. In the illustrated embodiment, the display 101 shows a textual reminder created by a user that takes the form of a digital to-do list that has been relationally associated with an area around a first grocery store that the user typically visits and has been relationally associated with the area around a second grocery store that a user sometimes visits. Element 301 is an enlargement of information (e.g., a digital to-do list) as it might appear upon the display of the portable computing device 111 upon the user entering either of the two aforementioned areas that are associated with the particular reminder. Thus, for example, as the user walks through the parking lot of his or her typically visited grocery store and crosses the boundary of the area defined around that grocery store, an alert triggers upon the portable computing device. In this example, the alert is an aural and tactile alarm that gains that attention of the user. The user looks at the portable computing device 111 and finds digital to-do list 301 displayed upon the display 101. He or she is thereby reminded that orange juice, diapers, and dog food need to be purchased at this store. In this way, the unique functionality performs a valuable service for the user.

The information displayed as shown in FIG. 3 indicates that a single digital reminder (e.g., a digital to-do list) may be associated with entering and/or exiting a plurality of different areas in the physical world. This is because the user may wish to be alerted to this reminder when he or she enters or exits a number of different physical locations relevant to the particular to-do list.

Figure 4:
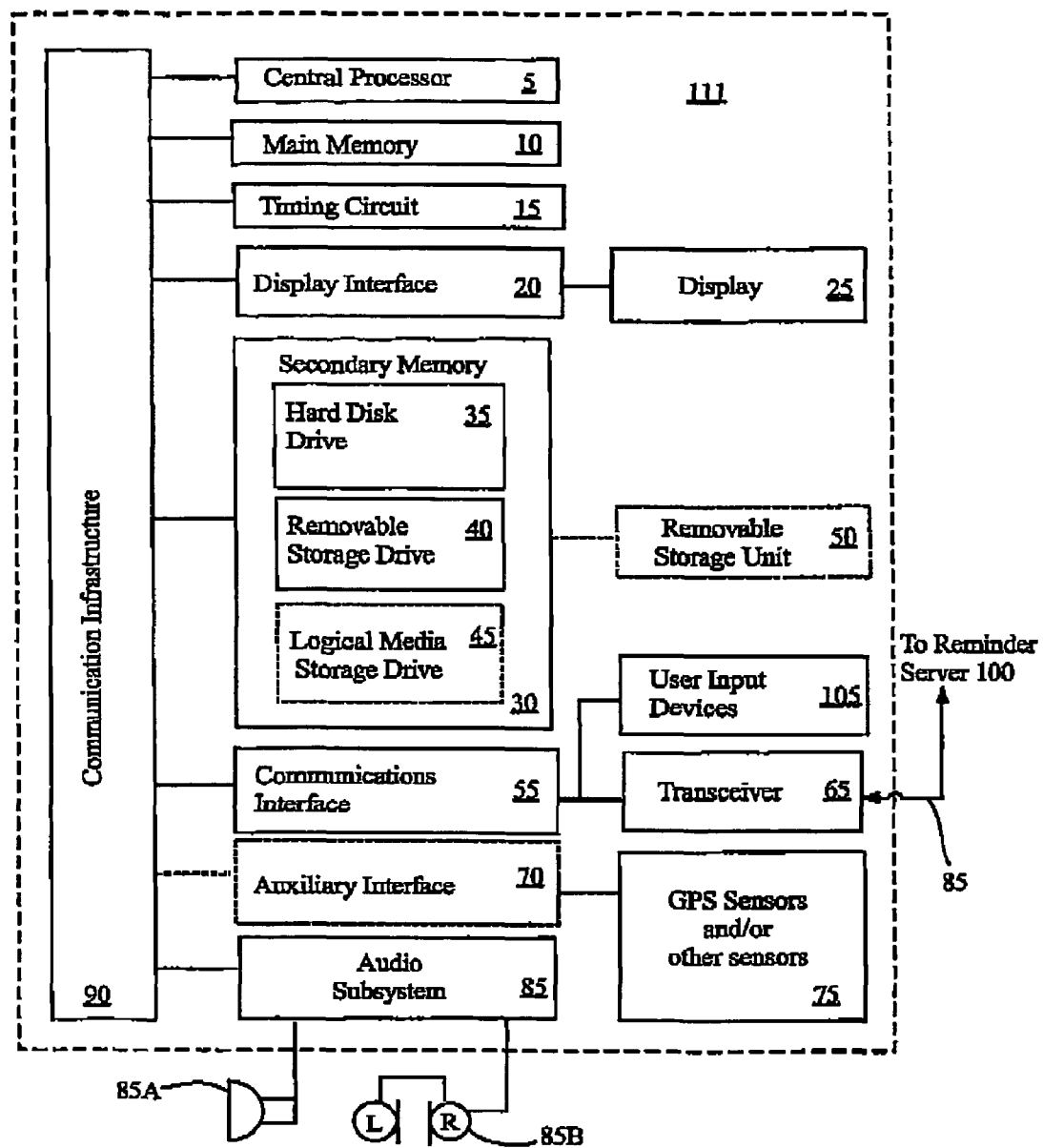
FIG. 4 illustrates an exemplary block diagram of one embodiment of a portable computing device incorporated within a spatially associated personal reminder system.

Referring to FIG. 4, an exemplary block diagram of a portable computing device 111 is depicted. The portable computing device 111 includes a communications infrastructure 90 used to transfer data, memory addresses where data items are to be found and control signals among the various components and subsystems of the computing device 111.

A central processor 5 is provided to interpret and execute logical instructions stored in the main memory 10. The main memory 10 is the primary general purpose storage area for instructions and data to be processed by the central processor 5. The main memory 10 is used in its broadest sense and includes RAM, EEPROM and ROM. A timing circuit 15 is provided to coordinate activities within the portable computing device. The central processor 5, main memory 10 and timing circuit 15 are directly coupled to the communications infrastructure 90.

A visual display interface 20 is provided to drive a visual display 25 associated with the portable computing device 111. The visual display interface 20 is electrically coupled to the communications infrastructure 90 and provides signals to the visual display 20 for visually outputting both graphics and alphanumeric characters. The display interface 20 may include a dedicated graphics processor and memory to support the displaying of graphics intensive media. The display 20 may be of any type (e.g., cathode ray tube, gas plasma) but in most circumstances will usually be a solid state device such as liquid crystal display. A secondary memory subsystem 30 is provided which houses retrievable storage units such as a hard disk drive 35, a removable storage drive 40, an optional a logical media storage drive 45 and an optional removal storage unit 50.

The removable storage drive 40 may be a replaceable hard drive, optical media storage drive or a solid state flash RAM device. The logical media storage drive 45 may be flash RAM device, EEPROM encoded with playable media, or optical storage media (CD, DVD). The removable storage unit 50 may be logical, optical or of an electromechanical (hard disk) design.

A communications interface 55 subsystem is provided which allows for standardized electrical connection of peripheral devices to the communications infrastructure 90 including, serial, parallel, USB, and Firewire connectivity. For example, user input devices 105 and a transceiver 65 are electrically coupled to the communications infrastructure 90 via the communications interface 55. For purposes of this disclosure, the term user input devices 105 includes the hardware and operating software by which a user executes procedures on the portable computing device 111 and the means by which the computing device displays information to the user.

The user input devices 105 employed on the portable computing device 111 may include a pointing device (not shown) such as a mouse, thumbwheel or track ball, an optional touch screen (not shown); one or more pushbuttons (not shown); one or more sliding or circular rheostat controls (not shown), one or more switches (not shown), and/or a tactile feedback unit (not shown); or the like; or combinations thereof. One skilled in the art will appreciate that the user input devices 105 which are not shown are well known and understood.

The portable computing device 111 also includes one or more sensors 75 for tracking the spatial location of the device in the physical world. The sensors often include a GPS transducer although other spatial tracking sensors may be used. In additional orientation sensors such as magnetometer sensors and/or accelerometer sensors may be used. The sensors may also be external peripherals connected to the portable computing device 111 and maintained local to the user such that they track the user's position and/or orientation within the physical world. The sensors may interface directly with the communication interface or may connect through an optional auxiliary interface 70 to couple such sensors to the communications infrastructure 90.

The transceiver 65 facilitates the remote exchange of data and synchronizing signals between the portable computing device 111 and other computing devices, including a remote server that may act as the reminder server. The transceiver 65 may be of a radio frequency type normally associated with computer networks for example, wireless computer networks based on BlueTooth (™) or the various IEEE standards 802.11.sub.x., where x denotes the various present and evolving wireless computing standards. Alternately, digital cellular communications formats compatible with for example, GSM, 3G and evolving cellular communications standards. Both peer-to-peer (PPP) and client-server models are envisioned for implementation. In a third alternative embodiment, the transceiver 65 may include hybrids of computer communications standards, cellular standards and evolving satellite radio standards.

Lastly, an audio subsystem 85 is provided and electrically coupled to the communications infrastructure 90. The audio subsystem provides for the playback and recording of digital media, for example, multi or multimedia encoded in any of the exemplary formats MP3, AVI, WAV, MPG, QT, WMA, AIFF, AU, RAM, RA, MOV, MIDI, etc. Such media files may include a user's own voice speaking the digital reminder. The audio subsystem includes a microphone input port 85A and a headphone or speaker output port 85B. Connection of the microphone 85A and/or headset 85B includes both traditional cable and wireless arrangements known in the art. As referred to in this specification, "media" refers to video, audio, streaming and any combination thereof. In addition, the audio subsystem is envisioned to optionally include features such as graphic equalization, volume, balance, fading, base and treble controls, surround sound emulation, and noise reduction. One skilled in the art will appreciate that the above cited list of file formats is not intended to be all inclusive.

The portable computing device 111 includes an operating system, the necessary hardware and software drivers necessary to fully utilize the devices coupled to the communications infrastructure, and reminder circuitry operatively loaded into main memory 10. Optionally, the portable computing device 111 includes at least one remote authentication application, one or more cryptography applications capable of performing symmetric and asymmetric cryptographic functions, and secure messaging software. Not shown in FIG. 4 is the reminder server 100. Portable computing device 111 may be coupled to the reminder server 100 by a bidirectional communication link 85. Microprocessor 5 is also operative to read data from sensors 75 which includes at least one locative sensor that tracks the current spatial location of the portable computing device. In many embodiments, the locative sensor is a GPS transducer as described previously. Other sensors may include magnetometer orientation sensor and/or accelerometer sensors. Not shown in FIG. 4 is the power source which may include, for example, rechargeable batteries. As mentioned previously, the portable computing device 111 has access to a reminder database which is stored locally in the primary and/or secondary memory on board the portable computing device 111.

With respect to embodiments in which the locative sensor 75 is a GPS sensor, there may be situations in which the sensor loses contact with the satellites and thereby is unable to provide accurate data. For example, if a user enters a building that masks the signal from the satellites, the portable computing device 111 may lose access to the locative sensor data. Accordingly, a history of locative values may be stored such that if the locative sensor data is suddenly lost the device has a store of the last valid locative sensor data point received. The reminder circuitry will use this last valid locative sensor data point received until the satellites are accessed again and new valid data is received.

Figure 5:
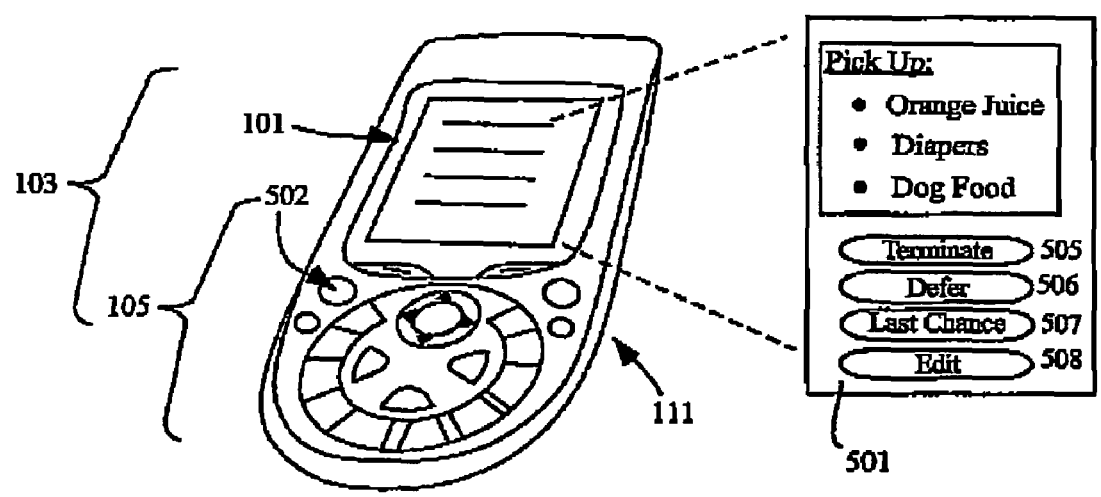
FIG. 5 illustrates one embodiment of a portable computing device incorporated within a spatially associated personal reminder system in which an exemplary personal digital reminder as well as an exemplary user interface is displayed.

FIG. 5 illustrates one embodiment of a portable computing device incorporated within a spatially associated personal reminder system in which an exemplary personal digital reminder as well as an exemplary user interface is displayed.

Referring to FIG. 5, the illustration shows one embodiment of a portable computing device 111 displaying an exemplary personal digital reminder as well as a particular user interface 103. As shown, a reminder reset button 502 is included as part of the user input devices 105. The reset button 502 may be engaged (e.g., pressed) by the user to select a reset reminder option, wherein the reset reminder option is adapted to reset a reminder. According to many embodiments, the reset reminder option has a different effect depending upon whether the reminder is entry-triggered (i.e. configured to trigger upon entry to an associated are), is exit-triggered (i.e. configured to trigger upon exit of an associated area) or both entry-triggered and exit-triggered. If the reminder is entry-triggered, the reset reminder option selected by the user causes the reminder circuitry to remove the reminder from the screen and reset the flags such that the reminder will not trigger again unless the user leaves the physical area that triggered the reminder and then enters an associated trigger area again. If the reminder is exit-triggered, the reset reminder option selected by the user causes the reminder circuitry to remove it from the screen and resets the flags such that the reminder will not trigger again unless the user again enters a physical area associated with the reminder again and then exits the associated trigger area again. If the reminder is both entry-triggered and exit-triggered, the reset reminder option selected by the user causes the reminder circuitry to remove it from the screen and resets the flags such that the reminder will not trigger again until the user exits any areas associated with the reminder that the user may currently be located within or until the user again enters an area associated with the reminder. In this way, by selecting the reset option, the user can clear the reminder from the screen and be assured that it will not trigger again until an area boundary crossing happens again.

In some embodiments, a slightly different boundary may be used for determining a user's entry into an area as compared to the one used to determine a user's exit so as to avoid situations in which a user may be standing (or mulling about) on the boundary of a trigger area and thereby repeatedly trigger alerts. In one such embodiment, the boundary area used for determining user entry (i.e., an "entry boundary") is slightly smaller than (i.e., inside of) a nominal boundary area and the boundary area used for determining user exit (i.e., an "exit boundary") is slightly larger than (i.e., outside of) the nominal boundary. This process, sometimes referred to as hysterisis, is applied herein to enable the reminder circuitry to provide for more robust and reliable determinations of user entry and/or user exit of a trigger area and thereby avoid situations wherein user entries and/or user exits are triggered as a result of sensor noise and/or as a result of a users mulling about on or near a boundary of a trigger area. A schematic representation of such boundary definitions are shown in FIG. 7.

Figure 7:
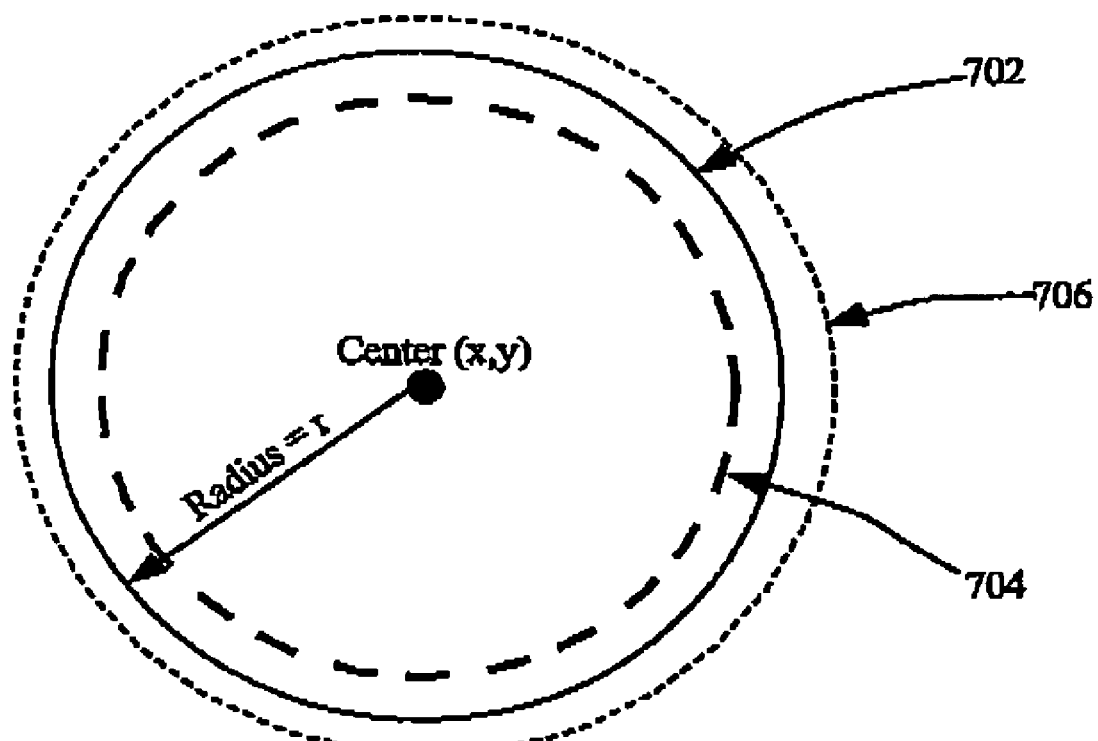
FIG. 7 schematically illustrates boundaries of an exemplary associated trigger area.

As exemplarily shown in FIG. 7, an essentially circular trigger area is drawn (although other shapes may be similarly used). In this example, a nominal boundary 702 of the circular area is defined using a center coordinate and a radius r as described previously, the entry boundary 704 of the circular area is defined as a radius r−d, where d is a trigger event adjustment distance (thus, the nominal boundary 702 extends beyond the entry boundary 704 by the trigger event adjustment distance d), and the exit boundary 706 of the circular area is defined as a radius r+d (thus, the exit boundary 706 extends beyond the nominal boundary 702 by the trigger event adjustment distance d). As shown, the boundary used for determining user entry is smaller than the boundary used for determining user exit. In this example, the technique is achieved by defining in reminder circuitry the trigger event adjustment distance d such that the entry boundary is defined by a circle of the same center as the nominal boundary but with a smaller radius (r−d) and the exit boundary is defined by a circle of the same center as the nominal boundary but with a larger radius (r+d). In this way, a single additional value for the trigger event adjustment distance d may be stored in memory and used to improve the functionality described herein. The trigger event adjustment distance d may be a fixed value (for example, d=12 feet) or may be a value that is determined by the user or determined automatically based upon the size of radius r. In some of such embodiments, the trigger event adjustment distance d is determined as a percentage of the nominal radius r (for example, d=10% of r).

Because GPS data and other locative sensor data signals may include some noise, the values may vary slightly even when the user is not moving. In some situations, the noise may cause the reminder circuitry to determine that the user has crossed a boundary when he or she has not. The aforementioned method of using a different boundary for entry as compared to the boundary used for exit, the two boundary regions separated by some distance (in this case by twice the distance d), may be helpful in reducing and/or eliminating the erroneous crossing determinations caused by signal noise. Accordingly, the value of d can be selected such that it is larger than the noise level in the sensor signal. Because GPS data often has signal noise on the order of at least a few feet, a value d chosen as 6 to 8 feet is often sufficiently large to eliminate (or significantly reduce) such problems.

Referring back to FIG. 5, embodiments exemplarily described herein provide additional reminder options (e.g., a terminate reminder option, a defer reminder option, a last chance reminder option, an edit reminder option, etc.) that are selectable by the user upon the display of a triggered reminder. These additional reminder options may be enabled through a variety of different user interface elements and/or controls. As exemplarily shown in FIG. 5, the additional reminder options may be presented to the user via the display 101. An exemplary presentation of such information is shown enlarged at 501. For example, one or more of a terminate reminder option 505, a defer reminder option 506, a last chance reminder option 507, and an edit reminder option 508, may be selected upon the user's engagement with the user interface 103. When selected by the user via the user interface 103, each of these reminder options causes the reminder circuitry supported by the portable computing device 111 to take certain actions. These actions are described as follows:

Terminate Reminder option: Upon the selection of a terminate (or equivalent) reminder option 505, the reminder circuitry clears the screen of the displayed reminder and removes the reminder from the reminder database and/or sets the reminder to an inactive state. In either case, the reminder is no longer active and will no longer trigger alerts and/or be displayed based upon the user's traversal of the physical world. Thus, a user who is displayed a reminder and acts on that reminder and/or determines that the reminder is no longer relevant or important can select the terminate reminder option. For example, the user returns home and upon entering a defined trigger boundary around his or her home, is alerted to a reminder. Upon viewing the reminder, the user may be displayed text that says "Defrost Dinner." Thus, upon entering his or her home, the user is reminded to take his dinner from the freeze and defrost it. Upon performing this action, the reminder no longer has any future relevance or importance and so the user will likely cause it to be terminated from the reminder database.

Defer Reminder option: Upon the selection of a defer (or equivalent) reminder option 506, the reminder circuitry clears the screen of the displayed reminder and sets a flag such that the reminder will be displayed again after a certain amount of time has elapsed, that certain amount of time being referred to herein as the "defer delay time." In some embodiments, the reminder will only be displayed again to the user if two conditions are met (e.g., if the defer delay time has elapsed and the user is still within the area that triggered the reminder). Thus, in some embodiments, the reminder will only be displayed again if the defer delay time has elapsed and conditions satisfying the trigger event associated with the reminder are still satisfied after the defer delay time has elapsed. Accordingly, upon a user selecting the defer reminder option, the reminder circuitry is operative to clear the screen and begin a process of determining if and when the defer delay time has elapsed. This is often achieved by setting a counter to the number of seconds in the defer delay time and decrementing the counter at repeated intervals that correspond with the elapsed number of seconds. When the counter is decremented to 0, the reminder is displayed again to the user. In some embodiments, the reminder is only displayed if the counter decrements to 0 and if the user is still within the area that had triggered the alert. For example, the user drives to Wal-Mart and upon entering an area near the entrance to the store, is alerted to a reminder. Upon viewing the reminder, the user is displayed text that says "Buy Raisin Bran." Thus, upon entering the store the user is reminded to buy the needed cereal. The user then engages the user interface 103 to select the defer option 506, causing the display to be cleared and causing the reminder circuitry to start counting down the defer delay time. In some embodiments, the defer delay time may be a constant set in memory such as 600 seconds. In other embodiments, the defer delay time is retrieved from the reminder database wherein a different value is stored for each reminder. The value may be stored in the reminder[ID].Defer_Time variable for that reminder ID. Thus, the reminder circuitry may retrieve this value from memory, update a counter to that value, and begin tracking elapsed time. When the elapsed time has passed, if the user is still within Wal-Mart, the reminder is triggered again. In this example, this may happen 7 minutes after the defer reminder option was selected. At this point, the user may be well within the store, well into his or her shopping, and may still have forgotten to get Raisin Bran. Thus, the user is reminded again after the defer delay time and is thereby less likely to forget to the needed cereal. Upon viewing the reminder on this second time, the user may elect to terminate the reminder by engaging the user interface 103 to select the terminate option 505. This would be the likely selection if the user has already gotten the Raisin Bran. On the other hand, if the user still needs to get the Raisin Bran and is worried about still forgetting, the user may engage the user interface 103 to select the defer option 506 again. In this case, the defer process is then repeated.

Last chance reminder option: Upon the selection of a last chance (or equivalent) reminder option 507, the reminder circuitry clears the screen of the displayed reminder and sets a flag such that the reminder will be displayed again when the user leaves the area that triggered the alert. Thus, upon a user engaging the user interface 103 to select the last chance reminder option 507, the reminder circuitry is operative to clear the screen and begin a process of determining if and when the user exits the boundary region of the area that he or she is currently within. This is useful because it gives the user a last chance to remember to perform the task or tasks in the reminder before significantly departing the establishment. For example, the user drives to a local Safeway Grocery Store and upon entering an area around the perimeter of the store, is alerted to a reminder. Upon viewing the reminder, the user is played an audio voice reminder that says "Pick up your Prescription". This message is also written in text upon the screen. Thus, upon entering the store, the user is reminded to stop at the pharmacy and pick up his prescription medication.

The user then engages the user interface 103 to select the last chance reminder option 507, causing the display to be cleared and causing the reminder circuitry to configure itself such that the user will be reminded again upon exiting the defined trigger area. In this way, the user will be alerted again to the reminder upon leaving the store in case he forgot to pick up his prescription.

Edit reminder option: Upon the selection of the edit (or equivalent) reminder option 508, the reminder circuitry enables the user to edit the content of the personal digital reminder. The user may, for example, add material, remove material, and/or change material. In this way, the user can update the reminder based upon whether or not a portion of the reminded task has been performed. For example, the user drives to a local Seven-Eleven and upon entering an area around the perimeter of the store, is alerted to a reminder. Upon viewing the reminder, the user is presented with a shopping list that includes numerous items that the user needs to purchase. The user may purchase some of those items, although not all of the items may be for sale at the store. The user may thus wish to update the reminder to-do list. He does this by engaging the user interface 103 to select the edit reminder option 508. Using the edit reminder option the user may cross items off the digital shopping list. Thus, reminder content within the personal reminder can be updated (i.e., altered) based on the user's engagement with the user interface 103.

Figure 6:
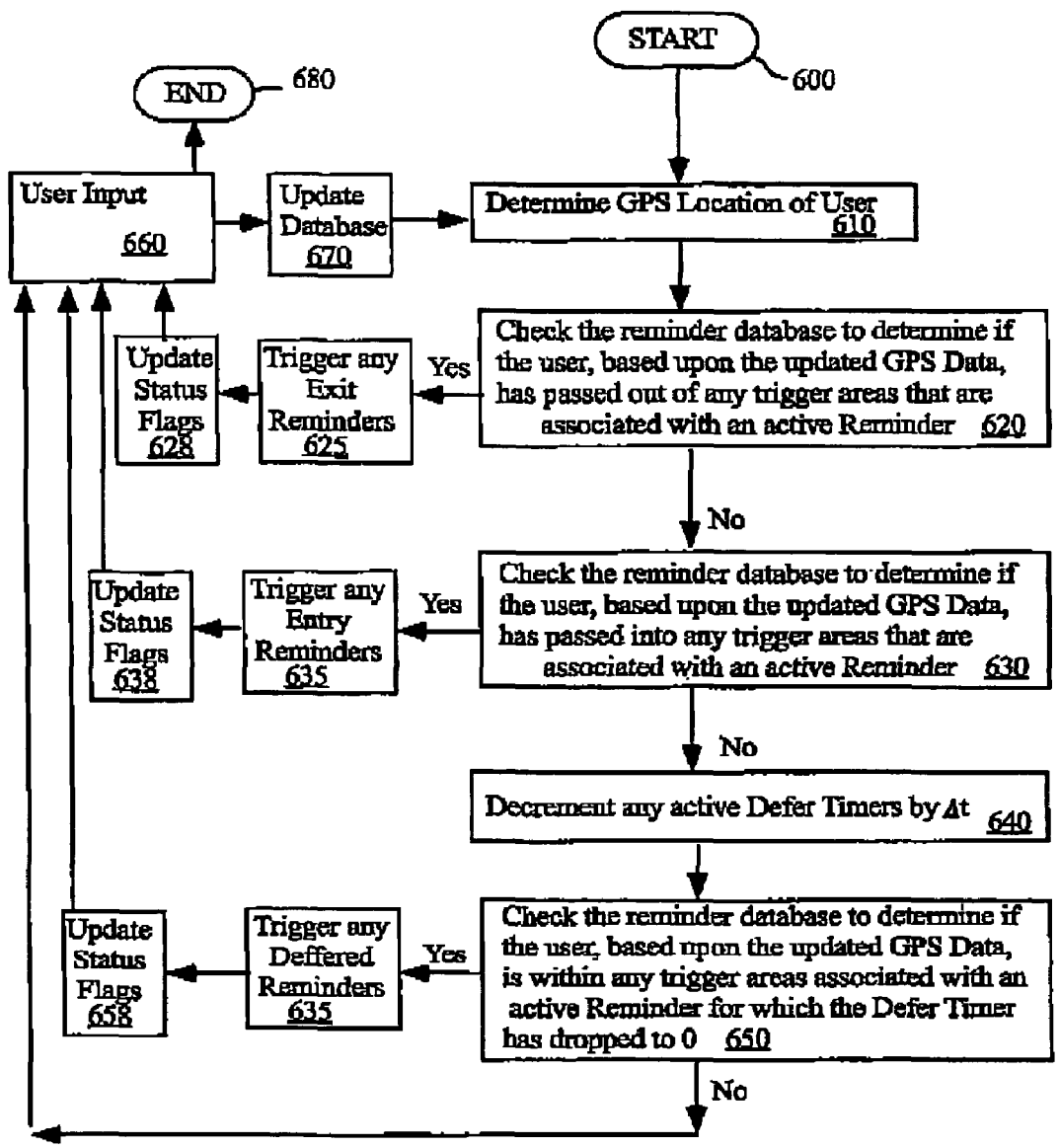
FIG. 6 illustrates one embodiment of an exemplary process for facilitating execution of the reminder options selectable via the user interface shown in FIG. 5.

FIG. 6 illustrates one embodiment of an exemplary process for facilitating execution of the reminder options selectable via the user interface shown in FIG. 5.

Referring to FIG. 6, one exemplary embodiment of a process for facilitating execution of the reminder options discussed above with respect to FIG. 5 is shown. It will be appreciated that the structure of the process shown in FIG. 6 is but one example and that the process can be performed in many alternate ways.

The process starts at 600 wherein a trigger detection and processing routine is initiated or called. The process proceeds to 610 where reminder circuitry supported by the processor of the portable computing device 111 reads locative sensor data from the locative sensor (which in this example is a GPS sensor). This locative sensor data will indicate spatial coordinates representing where within the physical environment the user is currently residing (it is assumed the portable computing device 111 is kept local to the user during use). The process then proceeds to 620 where the reminder circuitry accesses the reminder database and determines, based upon the locative sensor data, whether the user has passed out of any trigger areas associated with any currently active reminders. If it is determined from the flags in the reminder database that the user is not currently within any trigger areas (e.g., as determined by checking the Entry_Status_Flag values for all currently active reminders), the process at 620 may be skipped. If, on the other hand, it is determined from the flags in the reminder database that the user is currently within one or more trigger areas (e.g., as indicated by the Entry_Status_Flag values for all currently active reminders), the process at 620 is performed by checking (e.g., based upon the current location) if the user has passed out of the boundary of any of the trigger areas for which the user was previously determined to be within. This is performed for each trigger area the user was previously known to be within by mathematically comparing the current location of the user with a defined nominal boundary area (or exit boundary if employing the technique shown in FIG. 7). If the user's current location no longer falls within the boundary of that trigger area, he or she must have exited since the last time the data was updated.

If it is determined that the user has exited one or more trigger areas, the process proceeds to 625. At 625 any reminders that are configured to trigger upon the user exit of any trigger areas that the user has just exited are triggered. This might include exit reminders and/or entry reminders for which a last chance reminder option has been set. The user is alerted to these reminders and the reminders are displayed to the user. The process then proceeds to 628 wherein any status flags that need updating are updated. For example, the Entry_Status_Flag for any reminders associated with trigger areas that the user just exited are changed in value from 1 to 0, thereby indicating that the user is no longer inside a trigger area associated with those reminders.

The process then proceeds to 660 where the user is given the opportunity to provide input through the user interface. It is at this step that the reminder options are presented to the user and the user may, for example, elect to terminate the currently displayed reminder, edit the currently displayed reminder, defer the currently displayed reminder, or reset the currently displayed reminder. Depending upon what reminder options are selected by the user, the process proceeds to 670 and the reminder database is updated to reflect any terminations, edits, resets, or deferments, of reminders. The process then loops back to 610 where the GPS location is checked once again. In some embodiments, the checking of GPS location may be a background process that is performed in parallel with other processes described herein.

Going back to 620 in the previous cycle, if it had been determined that the user had not exited one or more trigger areas, the process would have proceeded to 630 instead of 625 described above. At 630, the reminder circuitry accesses the reminder database and determines if the user, based upon the updated location data, has entered into any trigger areas associated with any currently active reminders. This may be performed by checking (e.g., based upon the current location) if the user is currently inside the boundary of any of the trigger areas for which the user was previously not determined to be within. This may be done by mathematically comparing the current location of the user with a defined nominal boundary area (or entry boundary if employing the technique shown in FIG. 7). If the user's location falls within the boundary of a trigger area that is not currently identified by an Entry_Status_Flag as being an area the user is currently in, he or she must have entered the trigger area since the last time the data was updated.

In this way, it can be determined if a user entry has occurred. If it is determined that the user has entered one or more trigger areas, the process proceeds to 635. At 635, any reminders that are configured to trigger upon the user entering are triggered. The user is alerted to these reminders and the reminders are displayed to the user. The process then proceeds to 638 wherein any status flags that need updating are updated. For example, the Entry_Status_Flag for any reminders associated with the trigger areas that the user just entered are changed in value from 0 to 1, thereby indicating that the user is now inside a trigger area associated with those reminders.

The process then proceeds to 660 where the user is given the opportunity to provide input through the user interface. It is at this step that the reminder options are presented to the user and the user may, for example, elect to terminate the currently displayed reminder, edit the currently displayed reminder, defer the currently displayed reminder, last chance the currently displayed reminder, or reset the currently displayed reminder. Depending upon what reminder options are selected by the user, the process proceeds to 670 wherein the reminder database is updated to reflect any terminations, edits, last chances, resets, or deferments, of reminders. The process then loops back to 610 where the GPS location is checked once again.

Going back to 630 in the previous cycle, if it had been determined that the user had not entered one or more trigger areas, the process would have proceeded to 640 instead of 635 described above. At 640, the reminder circuitry decrements any active defer timers that may have been previously set. The defer timers are decremented by a time delta t, equal to the amount of time that has elapsed since the last time the timers were decremented. In this way, the timers keep track of elapsed time. In some embodiments, the timers are maintained in a background process that occurs in parallel with other processes described herein. In many embodiments, the reminder circuitry can determine which reminders have defer timers associated with them by checking the Defer_Status_ Flag, a binary value that indicates a reminder has a deferred presentation pending if set to 1.

The process then proceeds to 650 where the reminder circuitry accesses the reminder database and determines if any defer timers have been decremented to 0, thereby indicating that the elapsed time of the deferment for that reminder has expired. If so, the reminder circuitry checks (e.g., based upon the current location) if the user has remained within a trigger area associated with that reminder. This may be performed by checking if the user (based upon the current location) is currently inside the boundary associated with that reminder. If so, the process proceeds to 655. At 655, any reminders that are configured to trigger upon the expiration of a deferment time interval are triggered. The user is alerted to these reminders and the reminders are displayed to the user. The process then proceeds to 658 where any status flags that need updating are updated. For example, the Defer_Status_Flag for any reminders that the user was just presented with is changed in value from 1 to 0, thereby indicating that a deferred presentation is no longer pending for that reminder.

Going back to 650, if it had been determined that no defer timers had expired since the data was last checked, the process would have proceeded to 660 instead of 655. At 660, the user is given the opportunity to provide input through the user interface. It is at this step that the reminder options are presented to the user and the user may, for example, elect to terminate any currently displayed reminders, edit any currently displayed or selected reminders, defer any currently displayed reminders, last chance any currently displayed reminders, or reset any currently displayed reminders. Depending upon what reminder options are selected by the user, the process proceeds to 670 wherein the reminder database is updated to reflect any terminations, edits, last chances, resets, or deferments, of reminders. The process then loops back to 610 wherein the GPS location is checked once again.

At 660, the user may also be given the option of exiting the process shown in FIG. 6, thereby ending the automated reminder process. If the user elects this option, the routine ends at 680.

As mentioned above, embodiments exemplarily described herein allow a user to author personal digital reminders. In one embodiment, a user may author a personal digital reminder directly via the portable computing device 111. In another embodiment, a user may author a personal digital reminder on an alternate computing device and then download it into the portable computing device 111. The process of authoring a personal digital reminder (i.e., an authoring process) may include a user entering text, recording voice audio, and/or recording video as a means of generating and/or capturing reminder content. The authoring process may also include defining one or more trigger areas and associate the trigger areas with a reminder. Trigger areas may be defined and associated with a reminder in many ways, examples of which will be discussed below.

In some embodiments, the user creates a data store of known locations and/or establishments that are added to a menu, each location and/or establishment having data associated with it that defines the trigger area around or near it. For example, the user may have within his or her data store trigger area data for his or her home, his or her work, his or her gym, his or her favorite grocery stores, his or her dry cleaners, his or her favorite gas stations, and other establishments for which the user regularly attends and/or acquires products or services. In this way, the user need not enter data to define the area each time the user authors a reminder. The user, for example, may create a grocery list and then associate the grocery list with the appropriate trigger areas by selecting the related establishments from the data store. In one embodiment, the user may be provided with a menu of choices for establishments and/or types of establishments to link a reminder to. The user selects those establishments and/ or types of establishments from the menu and the reminder circuitry automatically links the reminder to the trigger areas linked to those establishments.

In some embodiments, the portable computing device 111 accesses a remote server (e.g., a reminder server 100) to find the trigger area information associated with a particular establishment and/or type of establishment. For example, if the user creates a reminder to get gasoline, the user may link that reminder to all BP Gas Stations by selecting that type of establishment. The portable computing device 111 then accesses the reminder server 100 which maintains the reminder database linking certain establishments to certain trigger areas and downloads one or more trigger areas associated with BP Gas Stations, each trigger area defining an area around the BP Gas Station. In this way, the reminder database may be automatically populated with trigger areas without the user needing to specifically define the location, shape, size, or other parameters associated with the area. Instead, the user may simply specify an establishment and/or type of establishment and thereby access the related trigger area information.

In some embodiments, the user may indicate a particular type of product or service related to a reminder and the personal computing device will automatically populate the reminder database with trigger areas associated with that product or service by accessing a remote reminder server that stores such relations. For example, the reminder server may store information relating each of a plurality of different types of products or services to each of a plurality of different types of establishments along with the trigger areas for those establishments.

In some embodiments, the user may wish to define a trigger area manually rather than access it from a pre-made data store as described above. For example, the user may wish to define a trigger area related to his or her house, his or her work, his or her gym, or his or her favorite park, etc . . . To do this, graphical user interface may be provided to enable a user to define spatial areas with respect to the real physical world and store those spatial areas as trigger areas linked to reminders. To support such functionality, it is desirable to provide the user with a user interface in which the user can view, for example, the physical world and associate real geospatial coordinates with the locations viewed. A number of applications currently exist that supports such geospatial viewing and navigation and are therefore well suited to be adapted to support these enhanced features described herein. One such application is called Google Earth. Such an application can be enhanced using direct coding or existing APIs to support additional features relevant to the present personal digital reminder as described herein.

Figure 8:
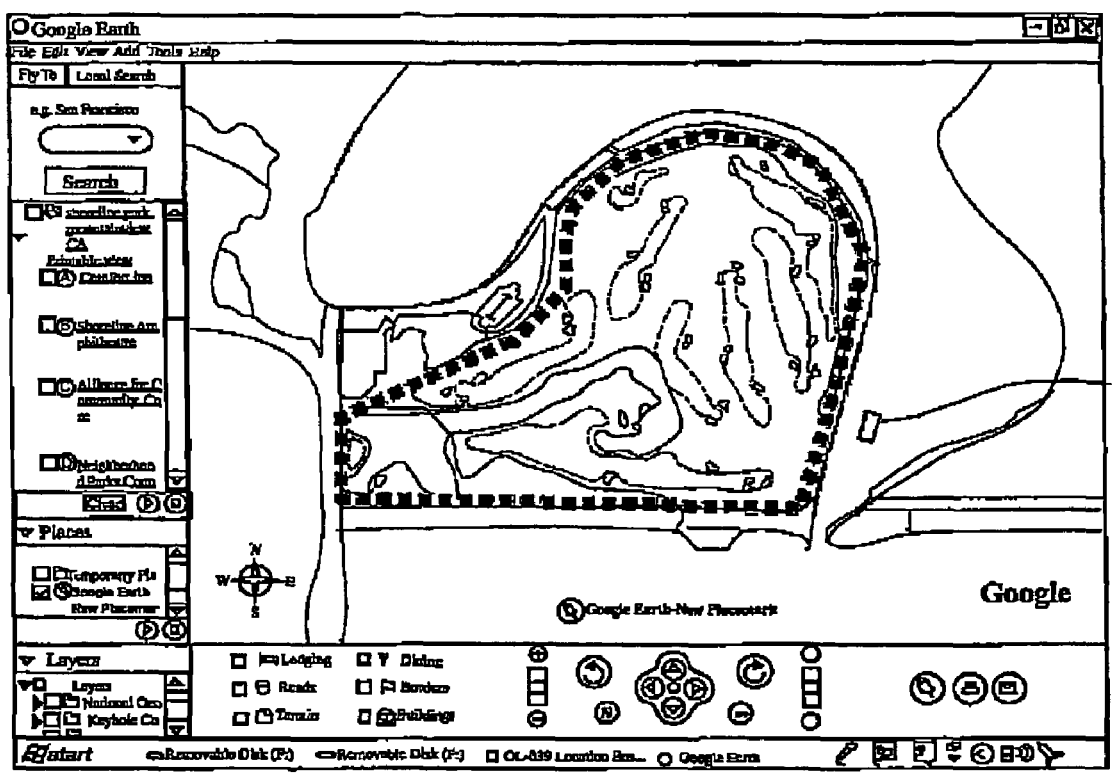
FIG. 8 illustrates one embodiment of information presented by the user interface, wherein the user interface and the presented information are adapted to enable users to define associated trigger areas with respect to the real physical world.

FIG. 8 illustrates one embodiment of information presented by the user interface, wherein the user interface and the presented information are adapted to enable users to define associated trigger areas with respect to the real physical world.

Referring to FIG. 8, the display of a computing device (e.g., portable computing device 111, portable computer 107, or personal computer 109) running an application such as an enhanced version of Google Earth can present a visually realistic representation of the physical world as seen from above. Typically, the imagery is depicted as satellite images and/or aerial photography taken from overhead. In some embodiments, such imagery is enhanced with graphical elements such as boundary lines, landmark demarcations, and/or other graphical and/or textual overlays. Using the user interface of such a computing device, the user can navigate the visual representation of the world by panning left, right, up, and down upon a spatially rotating globe as well as by zooming in and out upon specific areas of the earth. For example, by zooming and panning in appropriate directions a user can find very specific locations on the planet earth and view corresponding overhead imagery (e.g., satellite and/or aerial photography).

Also, by engaging the user interface, the user can find overhead views of establishments that he or she may wish to associate with personal digital reminders as disclosed herein. In one embodiment, the user interface of the spatially associated personal reminder system shown in FIG. 2 is adapted to enable the user to define an associated trigger area around the desired geospatial area and/or establishment being viewed from above. To define a trigger area, the user may engage the user interface (e.g., the mouse or other controller of the computing device) to draw the boundaries of the desired trigger area upon the overhead images being viewed. Such an operation may follow standard cursor-based drawing metaphors in which a user constructs standard shapes including circles, rectangles, and closed multi-sided polygons by wielding a mouse or other cursor control interface. When finished drawing a desired trigger area, the user engages the user interface to link a mathematical representation of the boundary to the reminder database. For example, as shown in FIG. 8, the user may wish to define a trigger area around a golf course that he or she visits. To do this, the user finds the golf course and views it from above using Google Earth. The user then engages the user interface described hereinabove to graphically draw the desired boundary region around the golf course (an exemplary graphical boundary region drawn by the user is shown as the dotted white line superimposed over the image of the golf course). The reminder circuitry supported by the computing device (e.g., the computing device running the adapted version of Google Earth or equivalent) then mathematically represents the drawn boundary region based upon the corresponding coordinates of the geo-spatial areas that the drawn boundary lines pass over. The boundary region may thus, be mathematically converted into a set of coordinates and exported to the reminder database.

Thus, the reminder circuitry described herein enables a user to engage the user interface of his or her computing device to quickly and intuitively define a trigger area in the real physical world (e.g., by drawing the trigger area upon geospatial image that corresponds with the desired location or establishment). In some embodiments, all that is required as output from the modified Google Earth application is a set of geo-spatial coordinates that define the boundaries of the user-drawn trigger area. For trigger areas that are standard shapes, the output may be stored as simplified mathematical forms. For example, a trigger area drawn as a circle may be represented a set of center coordinate and a radius as described previously. Thus, by providing a geo-spatial visualization and navigation application that is enhanced with user-boundary drawing capabilities, the spatially associated personal reminder system makes the process of defining and storing an associated trigger area much easier for the user. In some embodiments, a plurality of trigger areas may be defined in this way and relationally associated with a single personal reminder. In such embodiments, the user may be alerted to the personal reminder upon the determination of a trigger event occurring with respect to any one of said plurality of trigger areas. In some embodiments, a trigger area may also include an elevation and/or other height related parameter. For example, a trigger area may be associated with a particular elevation or range of elevations. In this way, a trigger area may be defined, for example, that identifies a particular floor or range of floors in a high-rise building.

While embodiments exemplarily described herein have been described by means of specific examples and applications thereof, numerous modifications and variations could be made thereto by those skilled in the art without departing from the scope of the invention set forth in the claims.

What is claimed is:

1. A spatially associated personal reminder method, comprising:

receiving current locative sensor data, the locative sensor data identifying a physical location of a user's portable computing device;

accessing a reminder database containing a personal reminder, wherein each personal reminder comprises reminder content and a trigger area relationally associated with the personal reminder, the reminder content identifying one or more tasks the user intends to complete in the future;

determining a current entry state of the user with respect to a trigger area that is relationally associated with a personal reminder by comparing the physical location identified within the current locative sensor data with a boundary of the trigger area;

accessing a piece of historical data from a memory of the portable computing device, the historical data being used to determine a previous entry state of the user with respect to the trigger area at a just recently past moment in time;

assessing whether a trigger event associated with the personal reminder has occurred based at least in part upon the current entry state and the previous entry state; and alerting a user to reminder content relationally associated with the trigger area when a trigger event is determined to have occurred, the alerting being performed via a display of the portable computing device.

2. The spatially associated personal reminder method of claim 1, wherein the trigger event is determined to have occurred when the previous entry state indicates the user was just previously outside the trigger area and wherein the current entry state indicates that the user is currently inside the trigger area.

3. The spatially associated personal reminder method of claim 1, wherein the trigger event is determined to have occurred when the previous entry state indicates the user was just previously inside the trigger area and wherein the current entry state indicates that the user is currently outside the trigger area.

4. The spatially associated personal reminder method of claim 1, wherein a different boundary of the trigger area is used in determining the previous entry state than in determining the current entry state.

5. The spatially associated personal reminder method of claim 4, wherein a size of the boundary depends at least in part on whether the user is currently inside the trigger area.

6. The spatially associated personal reminder method of claim 1, further comprising:
   authoring the personal reminder based upon the user's engagement with a user interface of the user's portable computing device; and
   storing the personal reminder in the reminder database.

7. The spatially associated personal reminder method of claim 6, wherein authoring the personal reminder comprises defining the trigger area by:
   graphically presenting overhead geographic imagery to the user via the display of the portable computing device;
   graphically representing a boundary of the trigger area over the overhead imagery based upon the user's engagement with the user interface; and
   converting the graphically represented boundary into a set of coordinates.

8. The spatially associated personal reminder method of claim 1, further comprising updating the reminder content based upon the user's engagement with a user interface of the user's portable computing device.

9. The spatially associated personal reminder method of claim 1, further comprising clearing the displayed reminder content from the display based upon the user's engagement with a user interface of the user's portable computing device.

10. The spatially associated personal reminder method of claim 9, further comprising resetting the personal reminder after an alert has been displayed based upon the user's engagement with the user interface such that the user may be alerted again to the personal reminder only if the user exits the trigger area and then subsequently reenters it.

11. The spatially associated personal reminder method of claim 9, further comprising terminating the personal reminder based upon the user's engagement with the user interface.

12. The spatially associated personal reminder method of claim 9, further comprising, instructing the portable computing device to alert the user again to the reminder content after a defer delay time has elapsed based upon the user's engagement with the user interface.

13. The spatially associated personal reminder method of claim 9, further comprising, subsequent to clearing the reminder content from the display:
   altering the user again to the reminder content upon a determination that the user has just exited the trigger area associated with the personal reminder.

14. The spatially associated personal reminder method of claim 1, further comprising instructing the portable computing device to alert the user again to the reminder content after exiting the trigger area based upon the user's engagement with the user interface.

15. The spatially associated personal reminder method of claim 1, wherein the reminder database is local to the portable computing device.

16. The spatially associated personal reminder method of claim 1, wherein the reminder database is remote from the portable computing device.

17. The spatially associated personal reminder method of claim 1, wherein the reminder content comprises information represented as at least one of text, audio, one or more images, graphics, and video.

18. The spatially associated personal reminder method of claim 1, wherein the trigger area comprises at least one of a physical area, one or more particular establishments, and one or more particular types of establishments.

19. The spatially associated personal reminder method of claim 1, wherein determining whether a trigger event has occurred comprises determining whether the user's portable computing device is currently outside a boundary of the trigger area that the user's portable computing device was previously determined to be within.

20. The spatially associated personal reminder method of claim 19, wherein the boundary includes a nominal boundary of the trigger area.

21. The spatially associated personal reminder method of claim 19, wherein the boundary includes an exit boundary of the trigger area, the exit boundary extending beyond the nominal boundary by a trigger event adjustment distance.

22. The spatially associated personal reminder method of claim 1, wherein determining whether a trigger event has occurred comprises determining whether the user's portable computing device is currently inside a boundary of the trigger area that the user's portable computing device was previously not determined to be within.

23. The spatially associated personal reminder method of claim 22, wherein the boundary includes a nominal boundary of the trigger area.

24. The spatially associated personal reminder method of claim 22, wherein the boundary includes an entry boundary of the trigger area, the nominal boundary extending beyond the entry boundary by a trigger event adjustment distance.

25. The spatially associated personal reminder method of claim 1, wherein the alerting comprises outputting an audible alarm to attract the user's attention.

26. The spatially associated personal reminder method of claim 1, wherein the personal reminder in the reminder database is also relationally associated with data that indicates whether the reminder should trigger upon entry into a trigger area, exit out of a trigger area, or both entry into and exit out of a trigger area.

27. The spatially associated personal reminder method of claim 1, wherein the assessing step comprises the trigger event requiring that the user remains within the trigger area for more than a certain amount of time.

* * * * *